(12) United States Patent
Davies et al.

(10) Patent No.: US 12,339,930 B2
(45) Date of Patent: Jun. 24, 2025

(54) SEQUENCE STRATIGRAPHIC INTERPRETATION OF SEISMIC DATA

(71) Applicant: Landmark Graphics Corporation, Houston, TX (US)

(72) Inventors: Andrew Davies, Abingdon (GB); Graham Baines, Abingdon (GB)

(73) Assignee: Landmark Graphics Corporation, Houston, TX (US)

(*) Notice: Subject to any disclaimer, the term of this patent is extended or adjusted under 35 U.S.C. 154(b) by 139 days.

(21) Appl. No.: 18/184,112

(22) Filed: Mar. 15, 2023

(65) Prior Publication Data
US 2024/0311444 A1    Sep. 19, 2024

(51) Int. Cl.
G06F 18/2411    (2023.01)
G01V 1/30    (2006.01)

(52) U.S. Cl.
CPC ............ *G06F 18/2411* (2023.01); *G01V 1/30* (2013.01)

(58) Field of Classification Search
None
See application file for complete search history.

(56) References Cited

U.S. PATENT DOCUMENTS

| | | | |
|---|---|---|---|
| 11,209,560 B2 | 12/2021 | Klinger | |
| 2007/0219724 A1 | 9/2007 | Li et al. | |
| 2008/0040043 A1 | 2/2008 | Leurer et al. | |
| 2009/0204377 A1 | 8/2009 | Van Wagoner et al. | |
| 2012/0072116 A1* | 3/2012 | Dorn | G01V 1/30 702/14 |
| 2019/0368316 A1 | 12/2019 | Bize-Forest et al. | |
| 2020/0301036 A1 | 9/2020 | Ramfjord et al. | |

FOREIGN PATENT DOCUMENTS

| | | |
|---|---|---|
| CN | 110609319 A | 12/2019 |
| CN | 111796326 | 10/2020 |
| CN | 110609319 B | 12/2021 |

OTHER PUBLICATIONS

"PCT Application No. PCT/US2023/064601, International Search Report and Written Opinion", Dec. 5, 2023, 11 pages.

* cited by examiner

*Primary Examiner* — Walter L Lindsay, Jr.
*Assistant Examiner* — Geoffrey T Evans
(74) *Attorney, Agent, or Firm* — DeLizio, Peacock, Lewin & Guerra LLP

(57) ABSTRACT

A method comprising obtaining a thickness for each of one or more sediment packages of a subsurface formation. The method comprises generating a thickness profile of each of the one or more sediment packages based on the thickness. The method comprises obtaining one or more properties of each of the one or more sediment packages based on the thickness profile. The method comprises generating, via a learning machine, one or more sediment package classifications based on the one or more properties. The method comprises and performing a subsurface operation based on the one or more sediment package classifications.

20 Claims, 16 Drawing Sheets

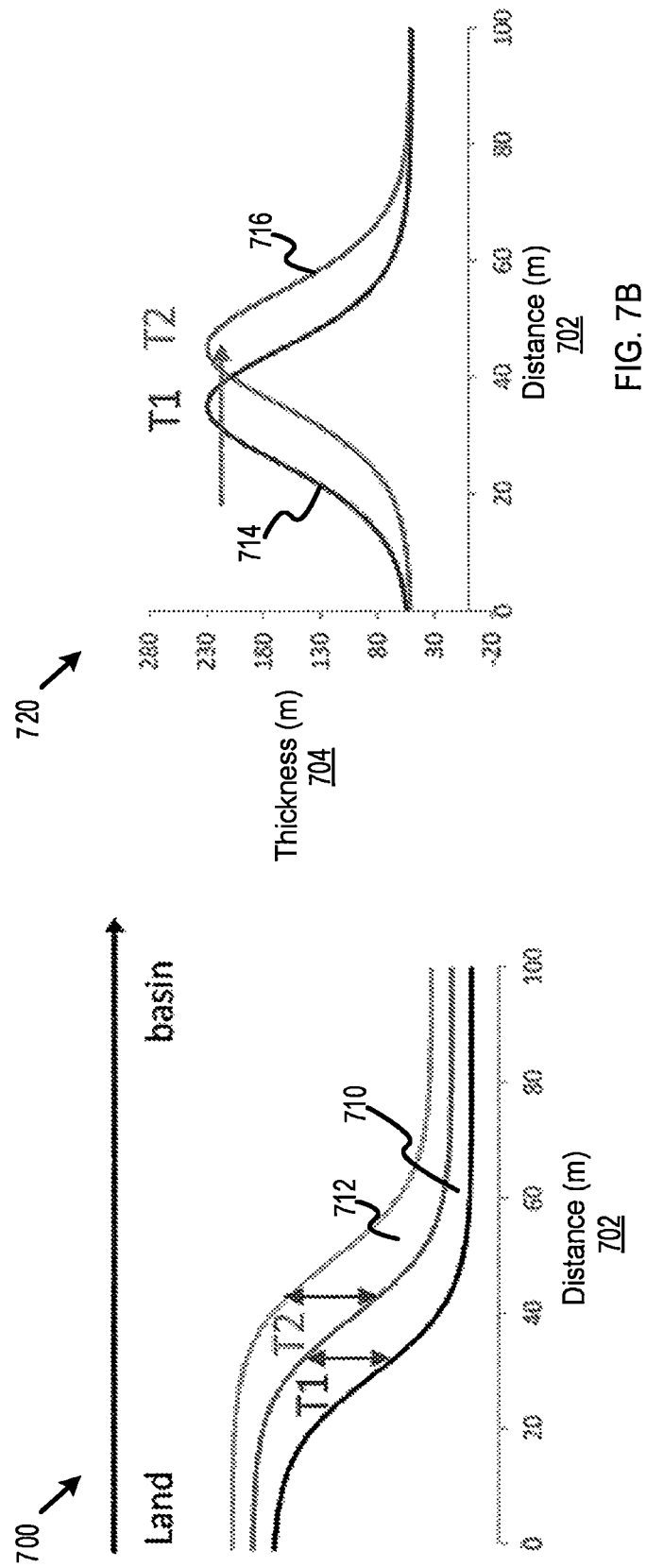

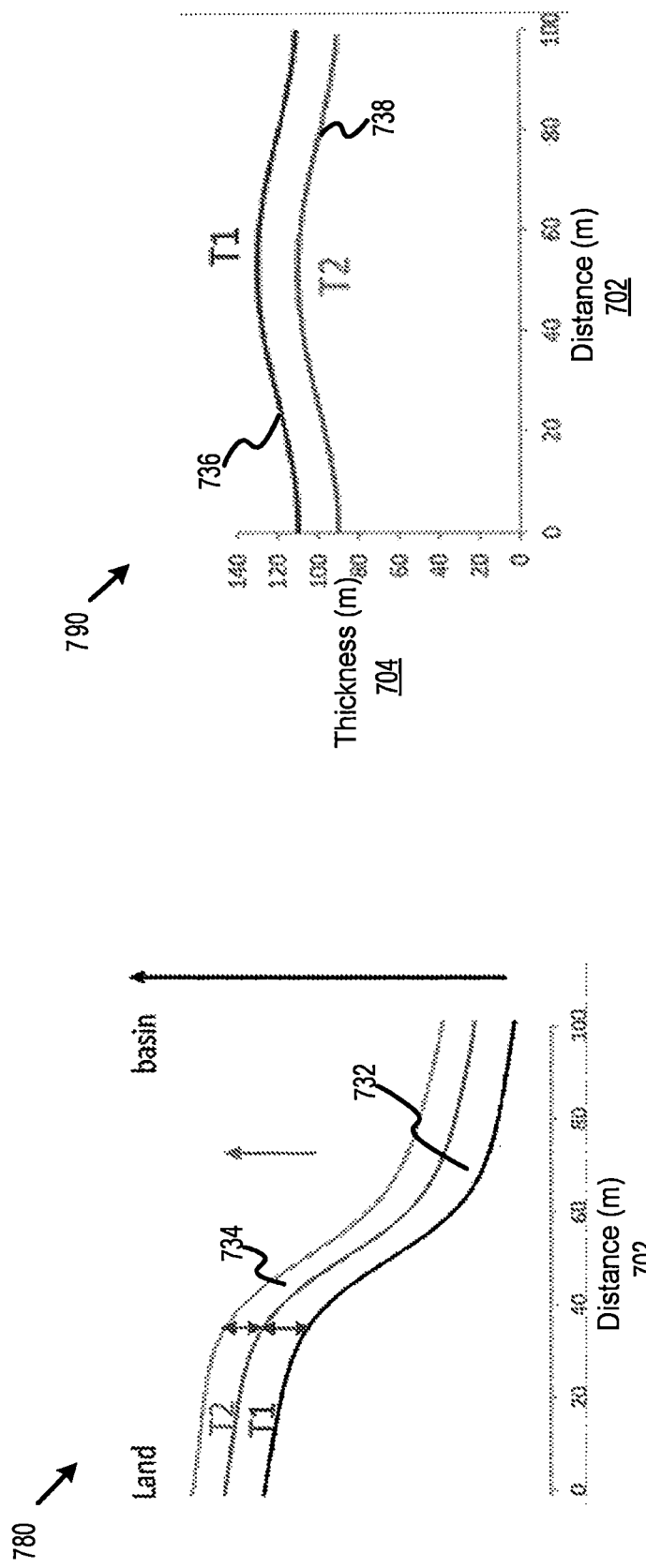

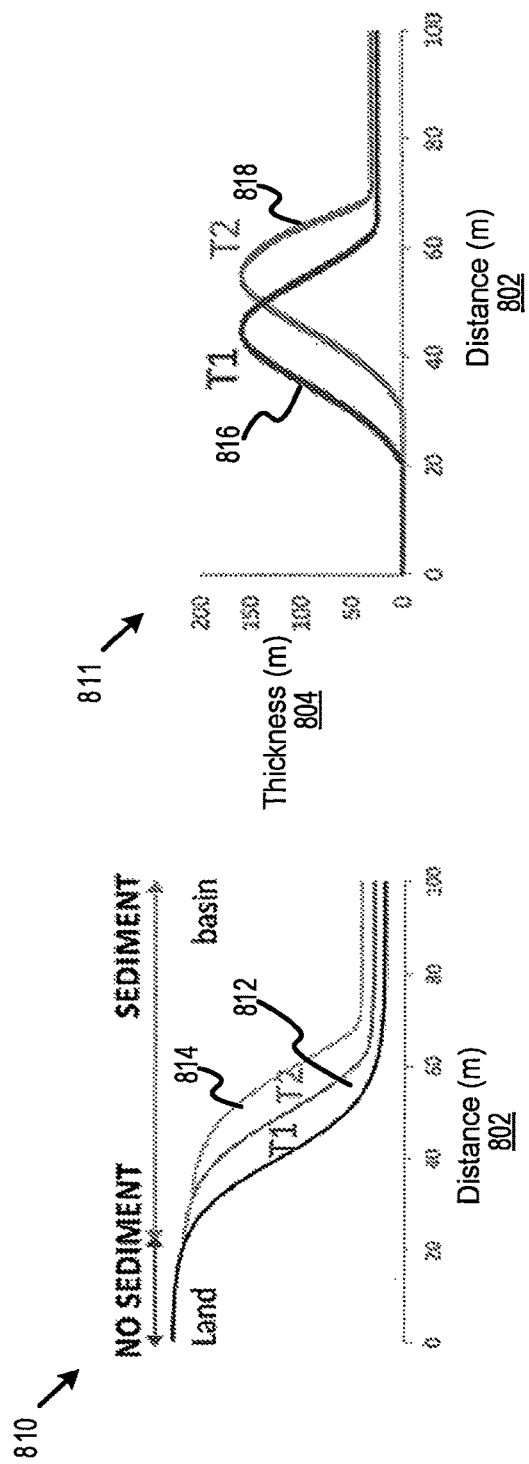
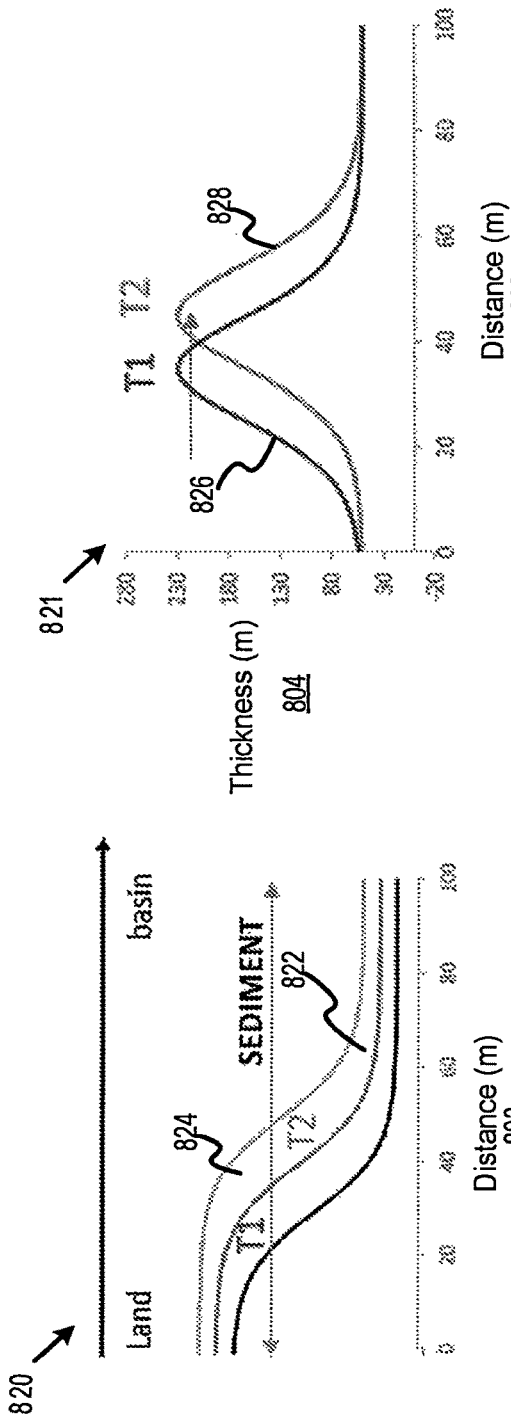

SEQUENCE STRATIGRAPHIC INTERPRETATION OF SEISMIC DATA

TECHNICAL FIELD

This disclosure relation generally to the field of sequence stratigraphy and more particular to the field of classifying systems tracts of a subsurface formation.

BACKGROUND

In the exploration and production of hydrocarbons in subsurface formations, sequence stratigraphy may be utilized to interpret the geology of the subsurface formations. Sequence stratigraphy may provide details on the relationships between sedimentation, sea level, and other geological processes. Sequence stratigraphy may comprise interpreting seismic data and/or well log data of a subsurface formation to identify systems tracts within the subsurface formation. The systems tracts may be utilized to predict facies patterns and sediment properties of sediment packages to improve subsurface models and/or reduce uncertainty in geology interpretations. As sequence stratigraphy is a powerful tool for predicting facies patterns and sediment properties away from well data, it may be utilized to improve subsurface models from exploration to reservoir scale and, therefore, it may support the goal of building superior, more geologically plausible subsurface models at all scales, assisting operators in making more informed decisions and maximizing asset values. It may also be utilized for emerging subsurface needs (e.g., carbon capture and storage, geothermal, etc.).

BRIEF DESCRIPTION OF THE DRAWINGS

Embodiments of the disclosure may be better understood by referencing the accompanying drawings.

FIGS. 7A-7F are illustrations depicting example sediment stacking patterns, according to some embodiments.

FIGS. 8A-8H are illustrations depicting example accommodation for sediment stacking patterns, according to some embodiments.

DESCRIPTION

Figure 1:
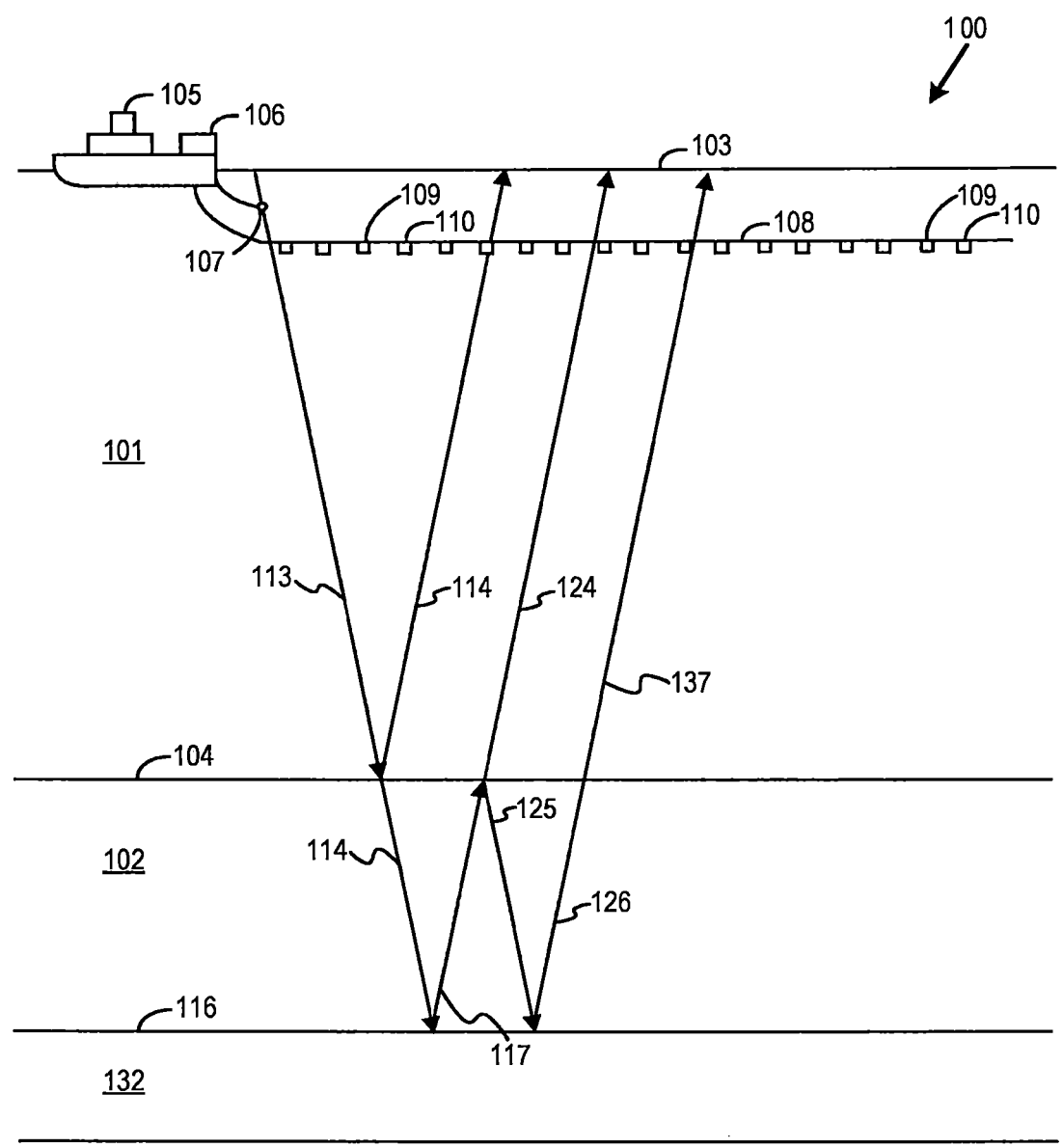
FIG. 1 is a conceptual diagram depicting an example seismic data system for obtaining seismic data of a subsurface formation, according to some embodiments.

The description that follows includes example systems, methods, techniques, and program flows that embody aspects of the disclosure. However, it is understood that this disclosure may be practiced without these specific details. For instance, this disclosure refers to classifying sediment packages utilizing seismic data. Aspects of this disclosure can also be applied to any other subsurface formation data such as well log data. For clarity, some well-known instruction instances, protocols, structures, and operations have been omitted.

Sequence stratigraphy may be a means of correlating and classifying sediments into distinct packages called systems tracts. As each systems tract may include distinct and predictable sedimentary stacking and facies patterns, it may be utilized for predicting facies patterns and sediment properties in a subsurface formation away from well data and, therefore, utilized to improve subsurface models and reduce uncertainty in interpretations. For example, it may be utilized to better understand the distribution of a hydrocarbon system's elements to inform exploration decisions, improve reservoir models, improve seismic inversion, and high grade seals for traditional and carbon capture and storage (CCS) projects. However, the interpretation of systems tracts in seismic and/or well log data may be challenging as it may be incorrectly or inconsistently applied and/or may not be conducted at all.

Example embodiments relate to sediment package classifications in seismic data to solve this challenge. In some embodiments, the seismic data may include two-dimensional (2D) seismic data and three-dimensional (3D) seismic data. Some embodiments may utilize thickness information that may be derived from manual or automated horizon interpretation. Thickness information may include the thickness of a sediment package (i.e., preserved sediment between horizons). The thickness of each sediment package may be synthesized into a normalized thickness profile that may depict the volume of sediment deposited along the depositional transect (i.e., from shore/land to basin). In some embodiments, properties of the normalized thickness profiles that describe the distribution of preserved sediment between horizons may be obtained. By comparing the distribution of preserved sediments between adjacent sediment packages, the pattern of sedimentation stacking (e.g., progradational, aggradational, or retrogradational) may be determined. In some embodiments, the sediment stacking patterns may provide insight into sediment package. For example, progradation may be significant in lowstand systems tract, indicating sediment package may be classified as a lowstand systems tract. Additionally, it may be determined if the accommodation space was being created or destroyed. The properties of the sediment package thickness profiles and comparison of properties of overlying and/or underlying sediment package thickness profiles may be utilized by a learning machine to generate sediment package classifications. For example, sediment packages may be classified as a transgressive systems tract (TST), a highstand systems tract (HST), a falling stage systems tract (FSST), a lowstand systems tract (LST), etc. In some embodiments, the sediment package classifications may include classified sediment packages in other sequences (e.g., non-sequence stratigraphic classifications) such as syn-rift from post-rift sequences.

In some embodiments, the sediment package classifications may be used to perform a subsurface operations in one or more subsurface formation. For example, a subsurface operation may be initiated, modified, or stopped based on the sediment package classifications. Examples of such downhole operations may include completion of the wellbore, updating drilling operations, perforating, fracking, logging operations, additional sampling of the subsurface formation, wellbore placement in the subsurface formation, etc. For instance, the sediment package classifications may indicate hydrocarbons may be located at a different location in the subsurface formation than what was originally predicted. Accordingly, subsurface operations may be adjusted to maximize recovery of these hydrocarbons.

Example System

FIG. 1 is a conceptual diagram depicting an example seismic data system for obtaining seismic data of a subsurface formation, according to some embodiments. FIG. 1 includes a seismic data system 100 in an offshore environment. In some embodiments, a system configured to collect and process seismic data similar to seismic data system 100 may be located onshore. A body of water 101 over a first geological layer 102 is bounded at a water surface 103 by a water-air interface and at a water bottom 104 by a water-earth interface. Beneath the water bottom 104 is a subsurface formation that may include one or more formation layers (i.e., sediment packages) such as first geological layer 102 and second geological layer 132. A seismic vessel 105 located on the water surface 103 and contains signal processor 106. The signal processor 106 may include a seismic data processor, navigation control, seismic source control, seismic sensor control, and recording equipment. The signal processor 106 may be local or remote to the seismic vessel 105.

The signal processor 106 may activate a seismic source 107 to actuate at selected times. In response, the seismic source 107 emits seismic waves. Seismic streamers 108 contain seismic sensors to detect the reflected waves initiated by the seismic source 107 and reflected from interfaces in the environment. The seismic streamers 108 may contain seismic sensors such as hydrophones 109 and/or water particle motion sensors such as geophones 110. The hydrophones 109 and geophones 110 are typically co-located in pairs or pairs of sensor arrays at regular intervals along the seismic streamers 108.

The seismic source 107 may be activated at periodic intervals to emit seismic waves in the vicinity of the seismic streamers 108 with the hydrophones 109 and the geophones 110. Each time the seismic source 107 is actuated, an acoustic/seismic wave may travel upwardly or downwardly in spherically expanding wave fronts. In this example system, the traveling waves are depicted as ray paths normal to the expanding wave fronts. The downwardly traveling wave from the seismic source 107 traveling along a ray path 113 may reflect off the earth-water interface at the water bottom 104 and then travel upwardly along ray path 114, where the wave may be detected by the hydrophones 109 and geophones 110. Such a reflection at the water bottom 104, as in ray path 114, may contain information about the water bottom 104 and hence may be retained for further processing. Additionally, the downwardly traveling wave traveling along ray path 113 may transmit through the water bottom 104 and travel along ray path 115 before reflecting off a layer boundary 116 (i.e., horizon). This wave may then travel upwardly along ray path 117, transmit through the water bottom 104, and travels upwardly along ray path 124 until it is detected by the hydrophones 109 and geophones 110. The reflection detected by the hydrophones 109 and geophones 110 may be represented as one or more seismic traces. Seismic traces may contain useful information about the first geological layer 102. The traces of the waves traveling along ray path 114 and ray path 124 may traces of primary reflection waves.

In addition, a portion of the wave traveling upwardly along ray path 117 may be reflected by the water bottom 104 and travel downwardly along the ray path 125. The wave traveling downwardly along ray path 125 may then be reflected by the layer boundary 116 again, travel upwardly along the ray path 126 until it transmits through the water bottom 104, and travel upwardly along the ray path 137 until it is detected by the hydrophones 109 and geophones 110. The reflection detected by the hydrophones 109 and geophones 110 may also be represented as one or more seismic traces. The seismic traces of the waves traveling along ray path 137 may be traces of seismic multiples, which have reflected off of the layer boundary 116 and the water bottom 104.

The seismic data detected by the hydrophones 109 and geophones 110 may be transmitted to the signal processor 106. The seismic data processor of the signal processor 106 may interpret horizons within the seismic data. Additionally, the signal processor 106 may perform operations, such as determining the thickness of sediment packages (i.e., layers of sediment within the subsurface formation such as geological layer 102 and 132) between the horizons, generating thickness profiles of each sediment package, generating properties of the thickness profiles, comparing properties between adjacent sediment package thickness profiles, and classifying sediment package as described herein.

Figure 2:
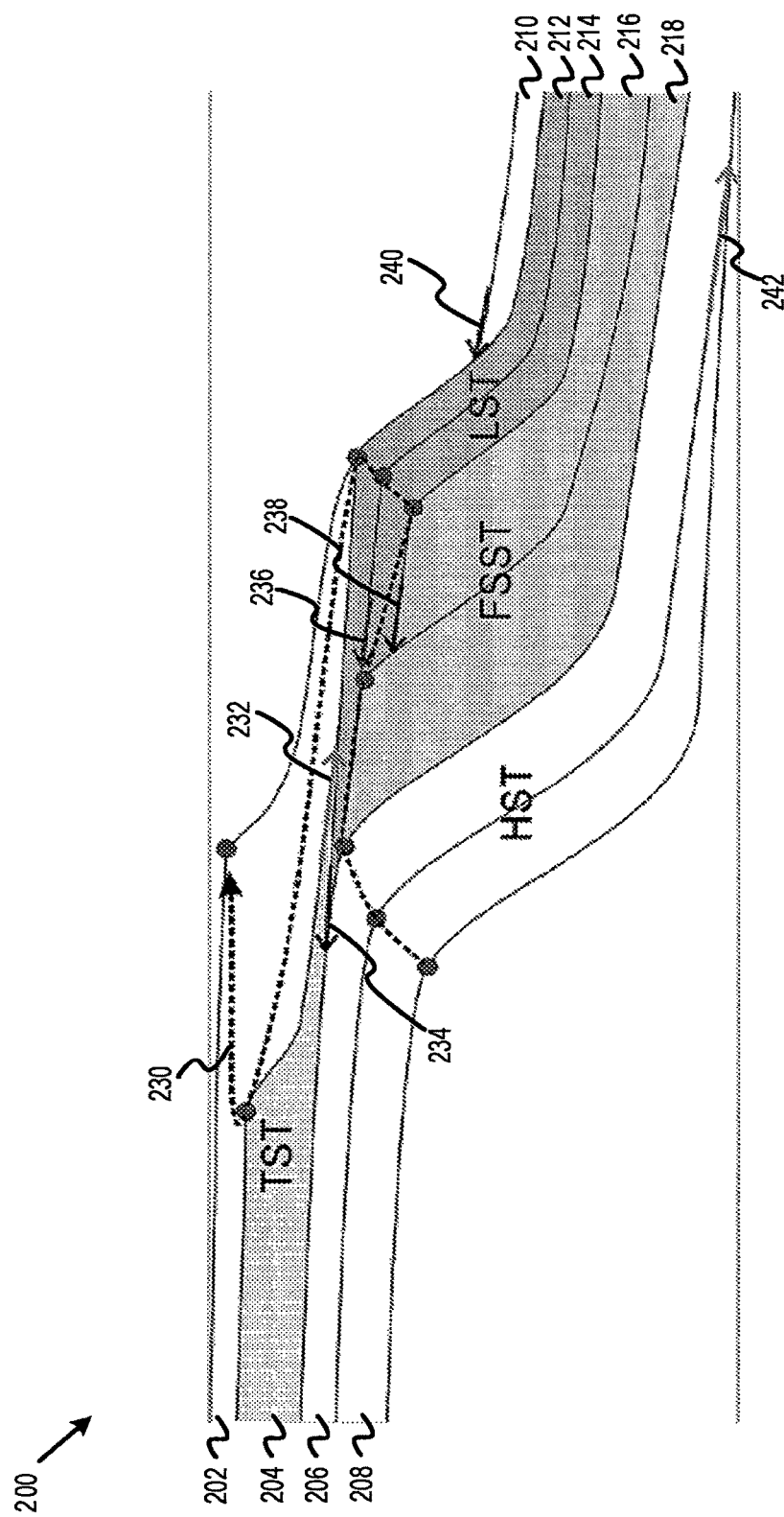
FIG. 2 is an illustration depicting an example sequence comprising systems tracts, according to some embodiments.

FIG. 2 is an illustration depicting an example sequence comprising systems tracts, according to some embodiments. More specifically, FIG. 2 includes a sequence 200 that may represent a cross section of a subsurface formation comprising sediment packages 202-218. The sediment packages 202-218 may be correlated and classified into distinct packages called systems tracts. For instance, sediment packages 206 and 208 make up a highstand system tract (HST), sediment packages 216 and 218 make up a falling-stage system tract (FSST), sediment packages 212 and 214 make up a lowstand systems tract (LST), and 204 makes up a transgressive systems tract (TST). In some embodiments, the systems tracts may be identified in seismic data by calculating a shelf edge position via rollover points of sediment packages, resulting in shelf edge trajectory 230 through time and/or examining stratal terminations to identify patterns such as onlap 234-240, downlap 232, 242, etc. Alternatively, thickness profiles of sediment packages 202-218 may be utilized to interpret the system tracts as described herein.

Example Operations

Examples operations are now described.

Figure 3:
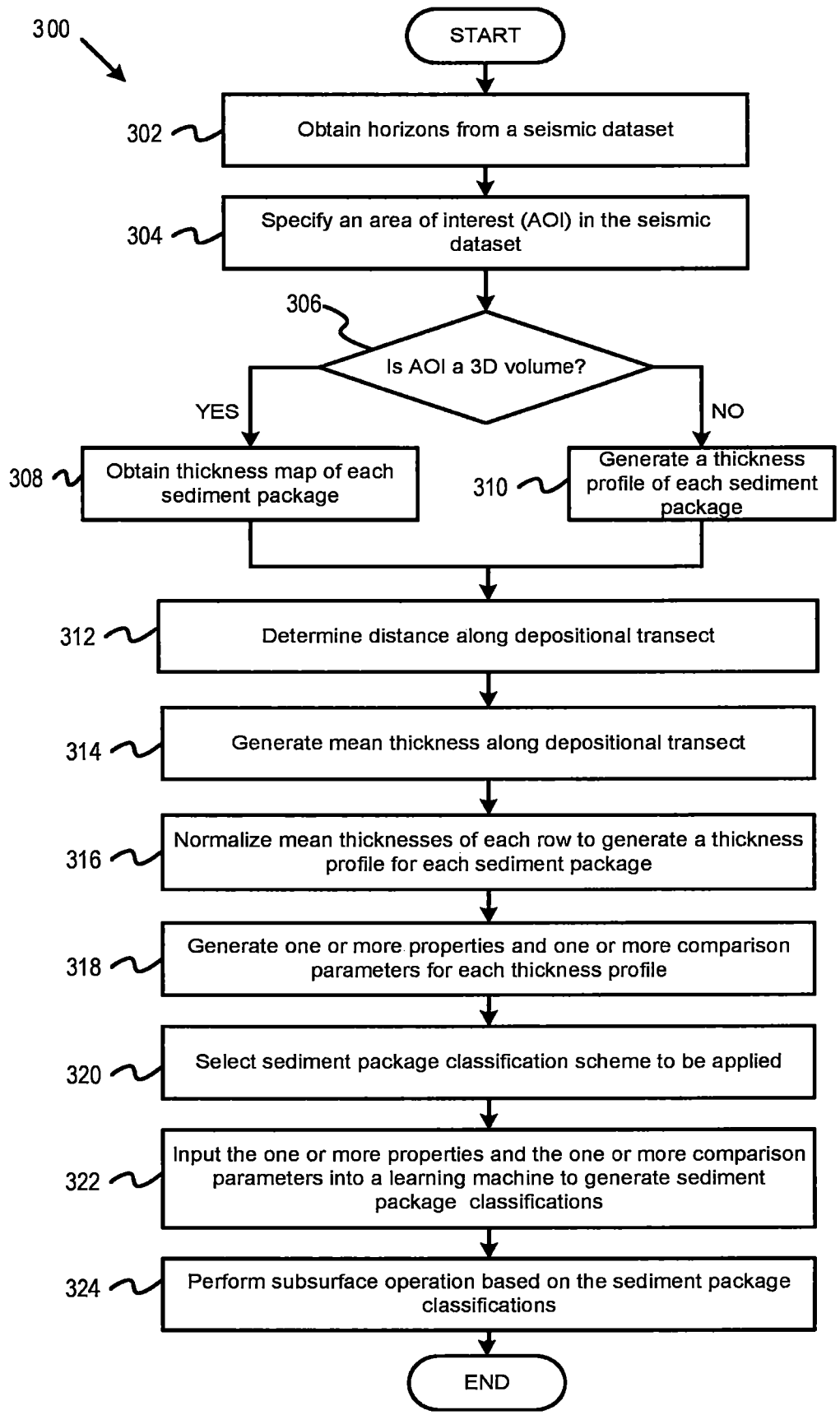
FIG. 3 is a flowchart depicting example operations for generating sediment package classifications, according to some embodiments.

FIG. 3 is a flowchart depicting example operations for generating sediment package classifications, according to some embodiments. FIG. 3 includes a flowchart 300 for generating sediment package classifications with a learning machine. Operations of flowchart 300 of FIG. 3 are described in reference to the signal processor 106 of FIG. 1. Additionally, the operations of flowchart 300 are described in reference to FIG. 4, FIG. 5, FIG. 6, FIGS. 7A-7F, 8A-8H, FIG. 9, and FIG. 10. Operations of the flowchart 300 start at block 302.

Figure 4:
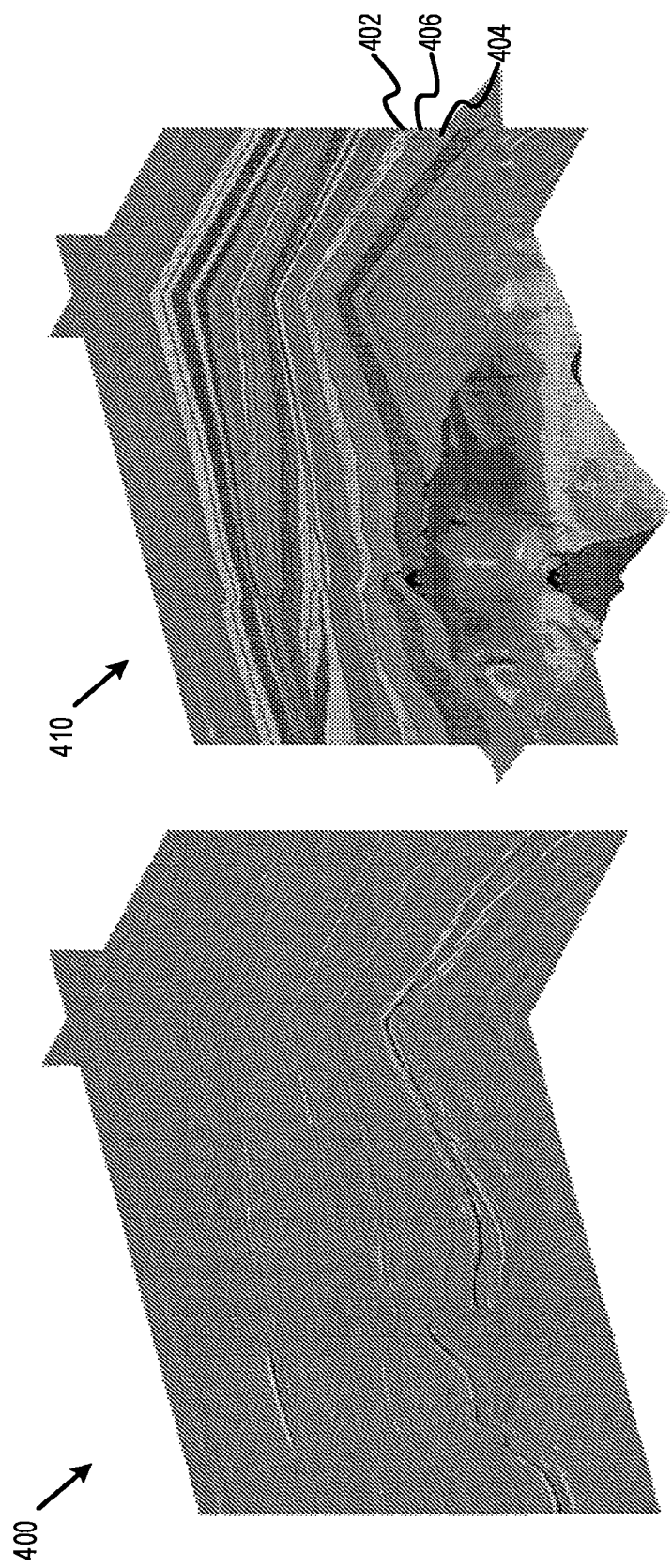
FIG. 4 is an illustration depicting an example seismic dataset, according to some embodiments.

At block 302, the signal processor 106 may obtain horizons from a seismic dataset. The seismic dataset may include 2D seismic dataset (i.e., a 2D grid), an entire 3D volume, a subset of a 3D volume (e.g., multiple sub-basins/depositional systems may exist in a 3D volume and a subset of the 3D volume may include at least one of the sub-basins), any combination thereof, etc. Horizons may indicate the interface between sediment packages in a subsurface formation. Horizons may be interpreted from seismic data. To help illustrate, FIG. 4 is an illustration depicting an example seismic dataset, according to some embodiments. More specifically, FIG. 4 includes seismic volume 400 and interpreted seismic volume 410. The seismic volume 400 may be processed to identify horizons such as horizon 406 in the interpreted seismic volume 410. The horizon 406 may be the interface between sediment packages 402 and 404. In some embodiments, horizons may be interpreted in a seismic volume (i.e., 3D seismic), such as seismic volume 400, and in a seismic line (i.e., 2D seismic). In some embodiments, the horizons may be interpreted in seismic data manually or automatically. In some embodiments, horizons may be obtained from well log data.

At block 304, the signal processor 106 may specify an area of interest (AOI) in the seismic dataset. An AOI may include the spatial area (e.g., distances north/south and east/west) and depth. For example, an AOI may be specified to include spatial area and depth range that encapsulates a depositional system within the subsurface formation.

At block 306, the signal processor 106 may determine whether the area of interest (AOI) is a 3D volume. If the AOI is 2D (i.e., a 2D cross-section), then operations proceed to block 310. Otherwise, operations proceed to block 308.

Figure 5:
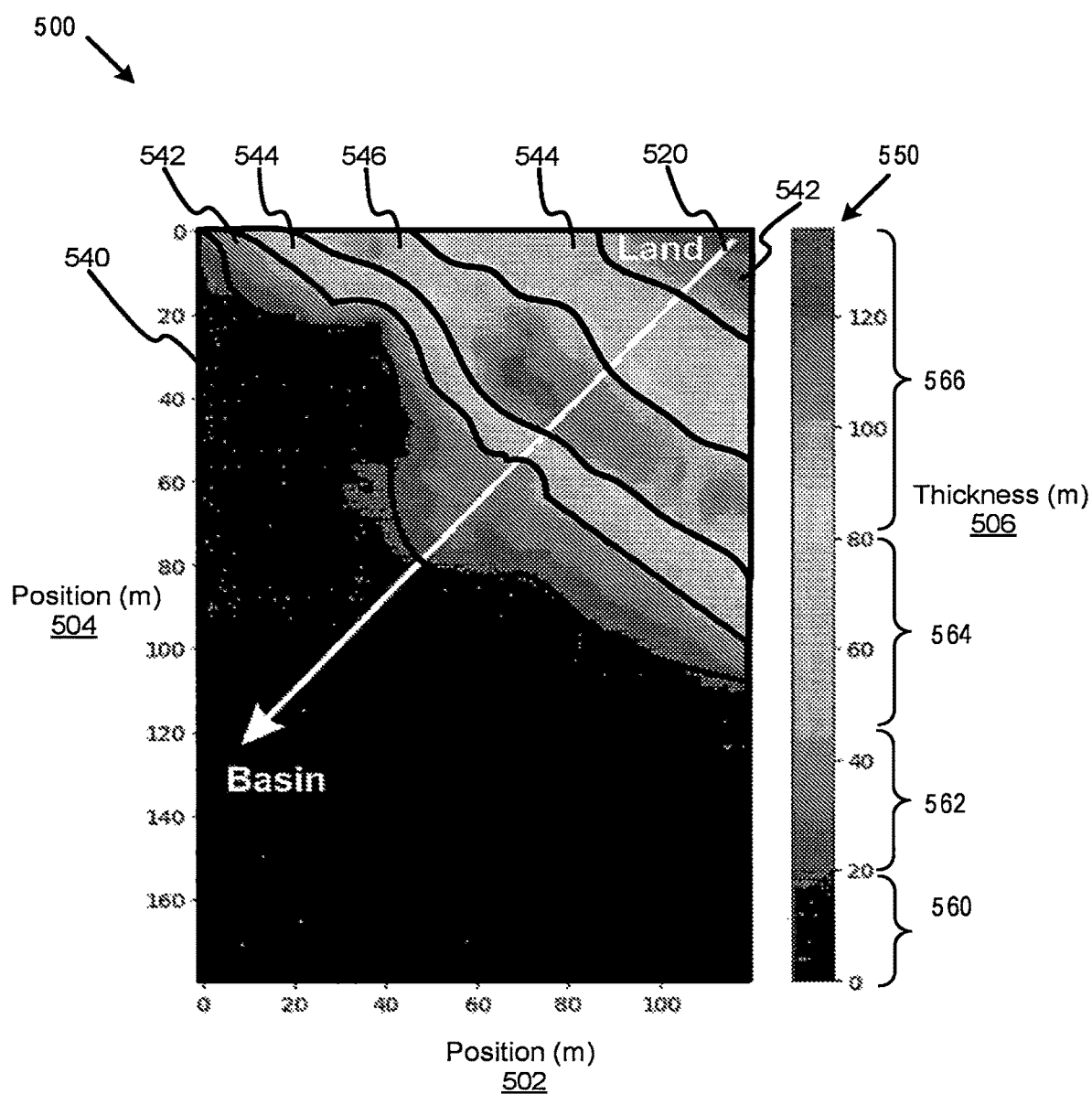
FIG. 5 is an illustration depicting an example thickness map, according to some embodiments.

At block 308, the signal processor 106 may obtain a thickness map of each sediment package. A thickness map may indicate the thickness of the sediment package at each position obtained in the seismic volume. To help illustrate, FIG. 5 is an illustration depicting an example thickness map, according to some embodiments. FIG. 5 includes a thickness map 500 of a sediment package obtained from a seismic volume and a thickness scale 550. The thickness map 500 includes an x-axis 502 and a y-axis 505. The x-axis 502 is the position in meters (m). In some embodiments, the position may be in the east-west direction relative to a point of origin designated in the seismic volume. The y-axis 504 is the position in meters (m). In some embodiments, the position may be in the north-south direction relative to a point of origin designated in the seismic data. The thickness scale 550 includes an axis 506. The axis 506 is the thickness in meters. The thickness scale 550 may indicate the thickness of the sediment package. To help visualize, the thickness map 500 is divided into regions of approximately similar thicknesses. The region 540 of the thickness map may correspond to the thickness range 560. The region 542 of the thickness map may correspond to the thickness range 562. The region 544 of the thickness map may correspond to the thickness range 564. The region 546 of the thickness map may correspond to the thickness range 566. The thickness of the sediment package may be measured in true depth. In some embodiments, the thickness may be measured in two-way-travel time (TWT). In some embodiments, the thickness map may be interpolated from a series of 2D seismic lines such as 2D seismic lines from a survey, 2D seismic lines from a subset of a survey, 2D seismic lines extracted from a 3D volume, etc. In some embodiments, the thickness map may be sparse (i.e., generated from a series 2D seismic lines) or dense (i.e., generated from a 3D volume as depicted in FIG. 5).

In some embodiments, the horizons, and subsequently the thickness of sediment packages, may be identified from well log data. Thus, a thickness map may be generated from the thickness data derived from well log data. For example, a field may comprise two or more wellbores drilled in a subsurface formation. Horizons may be obtained from well log information from the corresponding wellbores.

Returning to operation after block 306, if the AOI is not a 3D volume, then operations proceed to block 310. For example, the AOI may be a 2D cross-section. The 2D cross-section may correspond to a 2D seismic line. In some embodiments, a 2D seismic line may be extracted from a 3D volume. In some embodiments, AOI may correspond to a subset of the 2D seismic line.

At block 310, the signal processor 106 may generate a thickness profile of each sediment package. The thickness profile may be for each sediment package along the 2D cross section. For example, the thickness profile of a sediment package at each position along the depositional transect may be generated based on horizons obtained in block 302. The thickness profile may correspond to a line selected along the depositional transect. For example, the selected line of 2D seismic data may be oriented most closely aligned to the direction of the depositional transect. Operations proceed to block 312 after block 310.

At block 312, the signal processor 106 may determine the distance along the depositional transect. The depositional transect may indicate the orientation of the sediment package. For example, the depositional transect 520 of FIG. 5 indicates the direction from land to basin (i.e., from shallow water to deep water) of the sediment package. In some embodiments, the distance and/or direction of the depositional transect may be manually determined. For example, a user may define the depositional transect based on domain knowledge, historical data, etc. In some embodiments, the distance and/or direction of the depositional transect may be automatically defined. For example, the depositional transect may be based on average gradients in properties including observed depths to horizons, reconstructed paleo-topography, gradients of the thickness maps, etc. In some embodiments, if the depositional transect changes over time, the direction of the depositional transect may be defined as a function of time. In complex depositional environments (e.g., rift basins, carbonate build ups, etc.) it may not be possible to define a single depositional transect. In this instance, embodiments described herein may be applied only to at least a portion of the seismic data.

Figure 6:
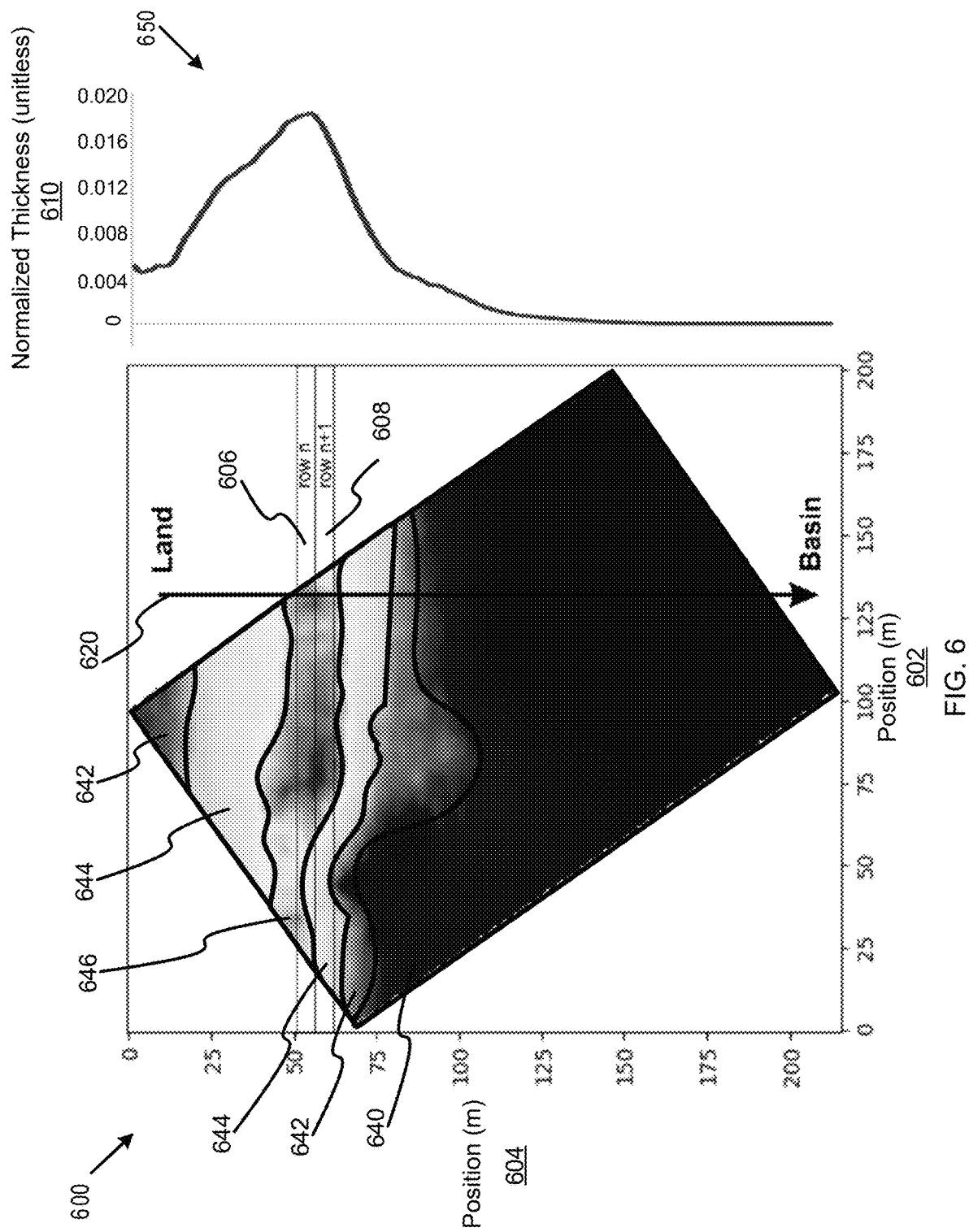
FIG. 6 is an illustration depicting an example rotated thickness map, according to some embodiments.

In some embodiments, once the depositional transect has been determined, the thickness map may be aligned with the depositional transect. For example, if the depositional transect is oriented in a northeast-southwest orientation (i.e., land to basin runs from the northeast to the southwest, respectively), then the thickness map may be rotated to be aligned in the northeast-southwest orientation. To help illustrate, FIG. 6 is an illustration depicting an example rotated thickness map, according to some embodiments. FIG. 6 contains a thickness map 600 that has been rotated to align with the depositional transect 620. The thickness map 600 includes x-axis 602 and y-axis 604. Each axis 602, 604 is a position measured in meters (m). The thickness map 600 also includes thickness regions 640-656 to indicate regions of the sediment package with approximately similar thicknesses (as described in FIG. 5). The positions of each axis 602, 604 may be relative to the orientation of the depositional transect 620. For example, if the depositional transect 620 is oriented in a northeast-southwest orientation (i.e., the land is in the northeast direction and basin is in the southwest direction), then the position of the x-axis 602 may be in the northwest-southeast direction and the y-axis 604 may be in the northeast-southwest direction. FIG. 6 also includes a thickness profile 650 generate, which is described in detail below.

In some embodiments, rather than aligning the thickness map to the depositional transect, each point on the thickness map may be assigned a distance from the basin margin or basin center. The basin margin or basin center may be defined by a line, polygons, etc. In some embodiments, the basin margin or basin center may be defined by a series of lines, polygons, etc. The basin margin or basin center may be manually defined. In some embodiments, the distances may then be binned and utilized to generate a thickness profile as described below. In some embodiments, the distance along the depositional transect may be defined as distanced including an absolute distance away from the basin center, an absolute distance into the basin from the basin margin, a proportional distance between the basin margin (e.g., distance is equal to zero) and the basin center (e.g., distance is equal to one), etc. In some embodiments, the distance may be defined from the most proximal point of the dataset to be analyzed.

At block 314, the signal processor 106 may generate a mean thickness for each point along the depositional transect. In some embodiments, the thickness variation along the strike of a basin due to spatial variations in a range of parameters, including sediment supply, subsidence, etc., may complicate the interpretation of a systems tract, as individual profiles along depositional dip may be difficult to interpret (e.g., low sediment supply) and/or may indicate contrasting stacking patterns for the same interval. This spatial heterogeneity may be addressed by synthesizing the thickness information of the thickness map and/or thickness profile from 2D seismic into a thickness transect with distance along a depositional transect. A single two-dimensional thickness transect describing a three-dimensional thickness map may be utilized to analyze sediment stacking patterns, accommodation space, etc. In some embodiments, the thickness map and/or profile may be divided into one or more bins (i.e., rows) based on the distance along a depositional transect, for example, after the thickness map has been aligned with the depositional transect. For example, the thickness map 600 of FIG. 6 depicts rows 606 and 608. The number of rows may be equivalent for each thickness map obtained from the seismic volume. The average thickness of each row may then be obtained to generate a thickness profile derived from the mean thickness along rows perpendicular to the depositional transect. For the 2D seismic data, the mean thickness along the depositional transect may be equivalent to the thickness generated in block 312. In some embodiments, statistics such as variance, standard deviation, standard error, etc. for each row/bin may be calculated. The aforementioned statistics may be utilized to generate one or more properties described in block 318.

At block 316, the signal processor 106 may normalize the mean thicknesses of each row to generate a thickness profile for each sediment package. In some embodiments, the mean thicknesses may be normalized by dividing the mean thickness of each row by the sum of the mean thickness rows along the depositional tract. For example, the mean thicknesses may be normalized such that the sum of the normalized mean thicknesses may be equal to 1. Normalization of the mean thicknesses may allow the sediment distribution of each sediment package to be better compared. Some embodiments may utilize any suitable technique to normalize the mean thicknesses.

The normalized mean thicknesses of a sediment package may then be utilized to generate a thickness profile of said sediment package. For example, FIG. 6 includes the thickness profile 650 of thickness map 600. The axis 610 is the normalized thickness and is unitless. The thickness profile 650 may describe the sediment thickness pattern and distribution along the depositional transect 620 of a sediment package. In some embodiments, multiple thickness profiles may be generated for a single sediment package at defined locations and/or for defined intervals that may allow any spatial variability to be analyzed.

At block 318, the signal processor 106 may generate one or more properties and one or more comparison parameters for each thickness profile. The one or more properties of a thickness profile may describe the thickness profile curve. Properties of the thickness profile may include the position of the maximum sediment thickness, the mean locus of sediment deposition, the skew and kurtosis of the thickness profile curve, the lower quartile and upper quartile of the thickness profile curve, etc. In some embodiments, the properties may be generated by statistics generated in block 314. Additionally, the properties of each thickness profile of each sediment package may be compared to adjacent sediment packages thickness profile properties (i.e., thickness profiles of sediment packages above and/or below a sediment package) in the seismic data to generate comparison parameters. For example, the properties of thickness profiles of sediment package 402 of FIG. 4 may be compared to the properties of the thickness profile of adjacent sediment package 404. In some embodiments, the comparison parameters may be generated by comparison of a sediment package to n number of sediment packages above and m number of sediment packages below said sediment package, where n may be greater than or equal to 1 and m may be greater than or equal to 1. In some embodiments, n may be equal to m and/or n may not be equal to m. The comparison parameters may include difference in a mean location, difference in skew, etc. In some embodiments, the comparison parameters may include concatenation of adjacent thickness profile properties, the difference between thickness profiles (and subsequently generating statistics thereof), etc. The properties of the thickness profiles for each sediment package and the comparison parameters between sediment packages may describe the sediment stacking patterns and whether accommodation space was being created or destroyed during deposition. The sediment stacking patterns may include progradational, aggradational, retrogradational, etc. In some embodiments, the sediment stacking patterns and accommodation space may be utilized to characterize sediment packages.

Figures 7C, 7D:
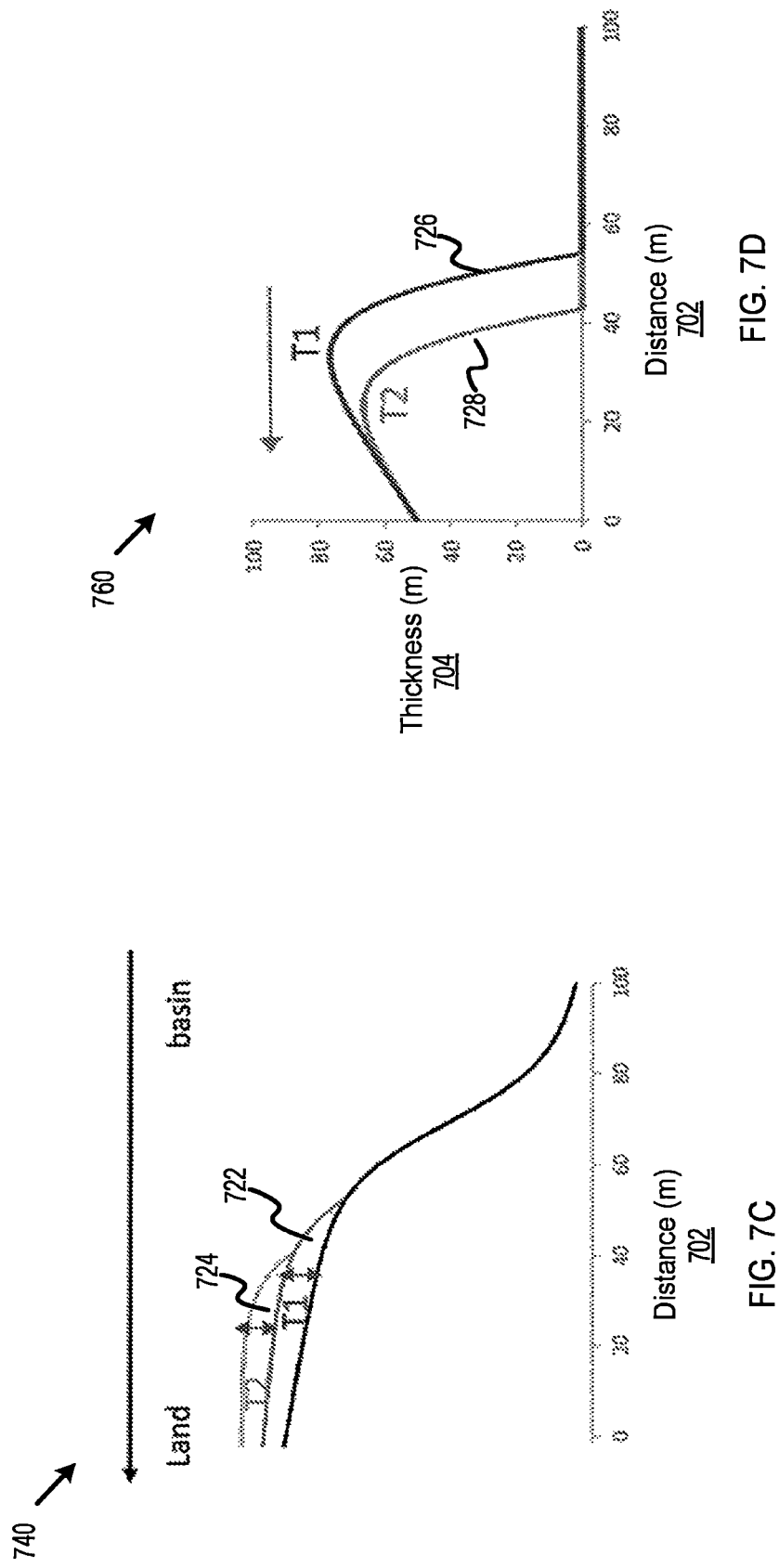

To help illustrate sediment stacking patterns, FIGS. 7A-7F are illustrations depicting example sediment stacking patterns, according to some embodiments. FIGS. 7A and 7B depict graphs 700 and 720, respectively. FIGS. 7C and 7D depict graphs 740 and 760, respectively. FIGS. 7E and 7F depict graphs 780 and 790, respectively. The graphs 700-790 include an x-axis 702. The x-axis 702 is the position along the depositional transect and having units in meters (m). Graphs 720, 760, and 790 include a y-axis 704. The y-axis 704 is the thickness of the sediment package and having units in meters (m). In some embodiments, properties and comparison parameters of graphs 720, 760, and 790 and corresponding sediment stacking patterns may be utilized as training data samples to train a learning machine to generate classifications of sediment packages. Alternatively, properties and comparison parameters of graphs 720, 760, and 790 may be input into a learning machine to generate systems tract classifications for each of the sediment packages if the systems tract classification are unknown for the respective sediment packages.

FIGS. 7A-7B depict a progradational stacking pattern. FIG. 7A includes graph 700 that depicts two sediment packages; sediment package 710 deposited at a time T1, and sediment package 712 deposited at time T2, where T1 is less than T2 (i.e., sediment package 710 was deposited before sediment package 712). The location of the thickest point of each sediment package moves away from land and towards the basin, indicating progradation. This may be visualized via thickness profiles, such as the thickness profiles 714 and 716 on graph 720 of FIG. 7B. Sediment package 710 may be synthesized to generate thickness profile 714, and sediment package 712 may be synthesized to generate thickness profile 716. As shown, the distance of the peak on thickness profile 716 (i.e., thickest point of sediment package 712) from land is greater than the distance peak on the thickness profile 714 (i.e., thickest point of sediment package 710) from land, indicating that the sediment stacking pattern is progradational.

FIGS. 7C-7D depict a retrogradation stacking pattern. FIG. 7C includes graph 740 that depicts two sediment packages; sediment package 722 deposited at a time T1, and sediment package 724 deposited at time T2, where T1 is less than T2 (i.e., sediment package 722 was deposited before sediment package 724). The location of the thickest point of each sediment package moves away from the basin and towards land, indicating retrogradation. This may be visualized via thickness profiles, such as the thickness profiles 726 and 728 on graph 760 of FIG. 7D. Sediment package 722 may be synthesized to generate thickness profile 726, and sediment package 724 may be synthesized to generate thickness profile 728. As shown, the distance of the peak on thickness profile 728 (i.e., thickest point of sediment package 724) from land is less than the distance the peak on the thickness profile 726 (i.e., thickest point of sediment package 722) is from land, indicating that the sediment stacking pattern is retrogradational.

FIGS. 7E-7F depict an aggradation stacking pattern. FIG. 7E includes graph 780 that depicts two sediment packages; sediment package 732 deposited at a time T1, and sediment package 734 deposited at time T2, where T1 is less than T2 (i.e., sediment package 732 was deposited before sediment package 734). The location of the thickest point of each sediment package does not move relative to the distance away from land and towards the basin, indicating aggradation. This may be visualized via thickness profiles, such as the thickness profiles 736 and 738 on graph 790 of FIG. 7F. Sediment package 732 may be synthesized to generate thickness profile 736, and sediment package 734 may be synthesized to generate thickness profile 738. As shown, the distance of the peak on thickness profile 738 (i.e., thickest point of sediment package 734) from land is approximately the same as the distance the peak on the thickness profile 736 (i.e., thickest point of sediment package 732) is from land, indicating that the sediment stacking pattern is aggradational.

Figure 8E:
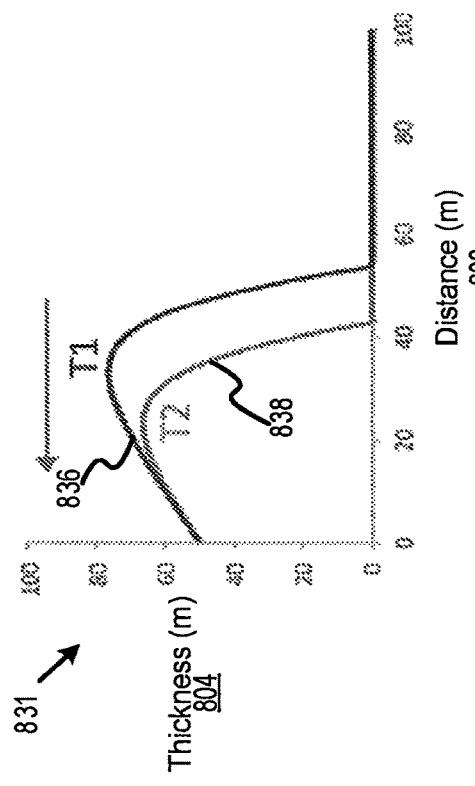
Figure 8G:
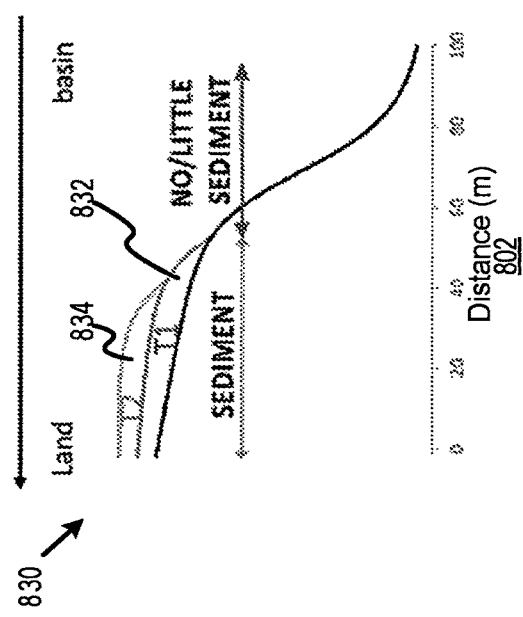
Figure 8F:
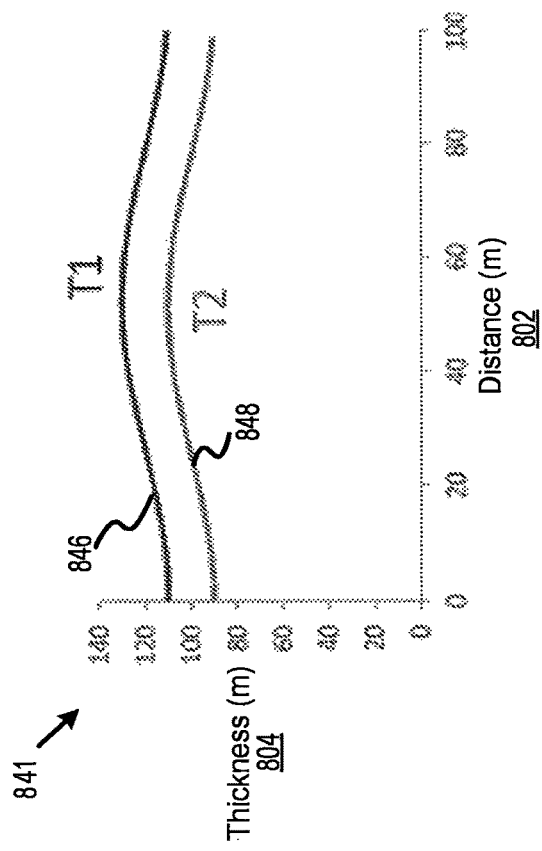
Figure 8H:
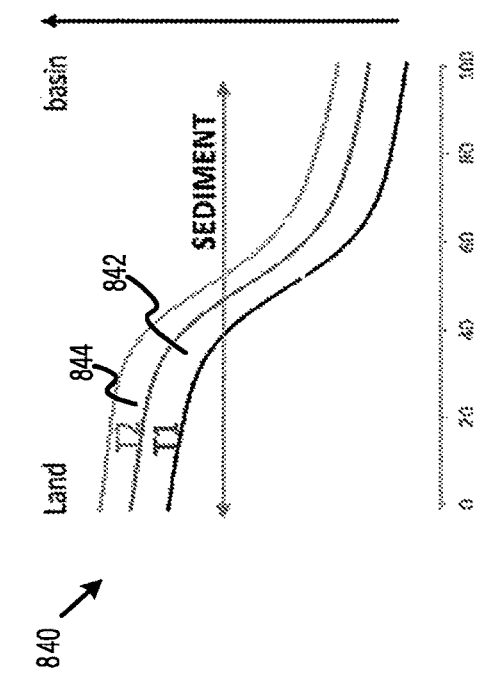

To help illustrate accommodation space during sediment deposition, FIGS. 8A-8H are illustrations depicting example accommodation for sediment stacking patterns, according to some embodiments. The accommodation may indicate sediment distribution in relation to the land and basin. FIGS. 8A and 8B depict graphs 810 and 811, respectively. FIGS. 8C and 8D depict graphs 820 and 821, respectively. FIGS. 8E and 8F depict graphs 830 and 831, respectively. FIGS. 8G and 8H depict graphs 840 and 841, respectively. The graphs 810-831 include an x-axis 802. The x-axis 802 is the position from land and having units in meters (m). Graphs 811, 821, 831, and 841 include a y-axis 804. The y-axis 804 is the thickness of the sediment package and having units in meters (m).

FIGS. 8A-8B depict a forced progradational stacking pattern that may indicate little to no accommodation towards land. FIG. 8A includes graph 810 that depicts two example sediment packages that may be obtained from 2D seismic data; sediment package 812 deposited at a time T1, and sediment package 814 deposited at time T2, where T1 is less than T2 (i.e., sediment package 812 was deposited before sediment package 814). As shown, there is no sediment distributed towards land and sediment distribution is concentrated towards the basin (i.e., sediment distribution increases as position increases), indicating there may have been zero to minimal accommodation towards land. The sediment stacking pattern may be confirmed via thickness profiles, such as the thickness profiles 816 and 818 on graph 811 of FIG. 8B. Sediment package 812 data may be synthesized to generate thickness profile 816, and sediment package 814 data may be synthesized to generate thickness profile 818. As shown, the distance of the peak on thickness profile 818 (i.e., thickest point of sediment package 814) from land is greater than the distance the peak on the thickness profile 816 (i.e., thickest point of sediment package 812) is from land, indicating that the sediment stacking pattern is progradational. Considering the distribution of sediment visualized in graph 810 and the thickness positions visualized in graph 811, the sediment packages may indicate forced progradation.

FIGS. 8C-8D depict an example normal progradational stacking pattern that may indicate accommodation is maintained towards land. FIG. 8D includes graph 820 that depicts two example sediment packages that may be obtained from 2D seismic data; sediment package 822 deposited at a time T1, and sediment package 824 deposited at time T2, where T1 is less than T2 (i.e., sediment package 822 was deposited before sediment package 824). As shown, sediment is distributed on land and the basin, indicating accommodation may be maintained towards land. The sediment stacking pattern may be confirmed via thickness profiles, such as the thickness profiles 826 and 828 on graph 821 of FIG. 8D. Sediment package 822 data may be synthesized to generate thickness profile 826, and sediment package 824 data may be synthesized to generate thickness profile 828. As shown, the distance of the peak on thickness profile 828 (i.e., thickest point of sediment package 824) from land is greater than the distance the peak on the thickness profile 826 (i.e., thickest point of sediment package 822) is from land, indicating that the sediment stacking pattern is progradational. Considering the distribution of sediment visualized in graph 820 and the thickness positions visualized in graph 821, the sediment packages may indicate normal progradation.

FIGS. 8E-8F depict an example retrogradation stacking pattern that may indicate accommodation is maintained towards land. FIG. 8E includes graph 830 that depicts example two sediment packages that may be obtained from 2D seismic data; sediment package 832 deposited at a time T1, and sediment package 834 deposited at time T2, where T1 is less than T2 (i.e., sediment package 832 was deposited before sediment package 834). As shown, sediment distribution may be concentrated on land and little to zero sediment concentration towards the basin, indicating accommodation may be maintained towards land. The sediment stacking pattern may be confirmed via thickness profiles, such as the thickness profiles 836 and 838 on graph 831 of FIG. 8F. Sediment package 832 data may be synthesized to generate thickness profile 836, and sediment package 834 data may be synthesized to generate thickness profile 838. As shown, the distance of the peak on thickness profile 838 (i.e., thickest point of sediment package 824) from land is less than the distance the peak on the thickness profile 836 (i.e., thickest point of sediment package 832) is from land, indicating that the sediment stacking pattern may be retrogradational.

FIGS. 8G-8H depict an example aggradation stacking pattern that may indicate accommodation is maintained towards land. FIG. 8G includes graph 840 that depicts example two sediment packages that may be obtained from 2D seismic data; sediment package 842 deposited at a time T1, and sediment package 844 deposited at time T2, where T1 is less than T2 (i.e., sediment package 842 was deposited before sediment package 844). As shown, sediment is distributed on land and the basin, indicating accommodation may be maintained towards land. The sediment stacking pattern may be confirmed via thickness profiles, such as the thickness profiles 846 and 848 on graph 841 of FIG. 8H. Sediment package 842 data may be synthesized to generate thickness profile 846, and sediment package 844 data may be synthesized to generate thickness profile 848. As shown, the distance of the peak on thickness profile 848 (i.e., thickest point of sediment package 824) from land is approximately the same as the distance the peak on the thickness profile 846 (i.e., thickest point of sediment package 842) is from land, indicating that the sediment stacking pattern may be aggradational.

Figure 9:
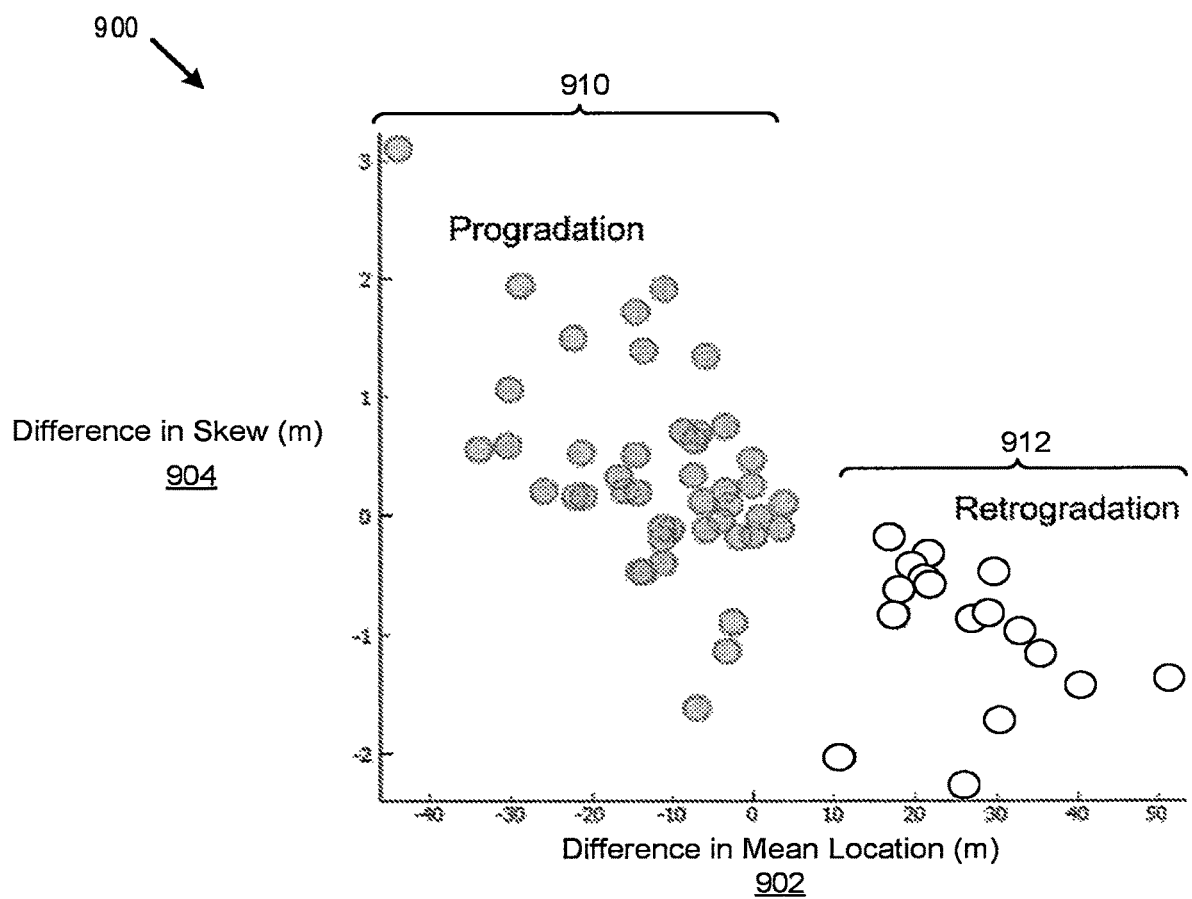
FIG. 9 is a graph depicting example comparison parameters, according to some embodiments.

FIG. 9 is a graph depicting example comparison parameters, according to some embodiments. FIG. 9 depicts a graph 900 that includes an x-axis 902 and a y-axis 904. The x-axis 902 is the difference in mean location and having units in meters (m). The y-axis 904 is the difference in skew. The x-axis 902 and y-axis 904 may be comparison parameters that describe the comparison of sediment package thickness profile properties (such as thickness profile 650 of FIG. 6). For instance, the comparison parameters (i.e., difference in mean location and difference in skew) may indicate progradation during deposition of the sediment packages 910. Alternatively, the comparison parameters may indicate retrogradation during deposition of the sediment packages 912. Parameters such as the difference in mean location and difference in skew may be utilized as input for a learning machine to classify the sediment packages, as described below. Additionally, the clustering of sediment packages 910 and 912 and labeling the respective comparison parameters with a sediment stacking pattern may be utilized as training data to train the learning machine, as described in FIG. 12.

In some embodiments, there may be significant missing sections of thickness information, such as those relating to erosional unconformities, which may impact the properties and comparison parameters. In some embodiments, mitigation of missing sections may include identifying the affected surfaces (i.e., manually identifying the affected surfaces and/or automatically identifying the affected surfaces utilizing tools such as an unconformity identification tool) and then masking the affected surfaces during the generation of the properties for all affected sediment packages, such that the classification may not be affected by the missing sections.

Returning to block 318, the sediment stacking patterns and the creation and/or destruction of accommodation space characterized by the thickness profile properties and/or comparison parameters may provide insight into the systems tracts of sediment packages. These may be captured in the properties and/or parameters as described above, and utilized by a learning machine to classify system tracts, as described below. In some embodiments, the classification can be manually performed utilizing the properties described above.

At block 320, the signal processor 106 may select a sediment package classification scheme to be applied. The sediment package classification scheme may be a sequence stratification classification scheme comprising systems tracts classifications. Systems tracts classifications may include transgressive systems tract (TST), a highstand systems tract (HST), a falling stage systems tract (FSST), a lowstand systems tract (LST), etc. For example, a classification scheme may include a TST, HST, FSST, and LST. In some embodiments, the classification scheme may comprise a TST, and regressive systems tract (RST). The classification scheme may be applied to a learning machine. For example, the learning machine may be trained to output systems tract classifications based on the classification scheme applied to the learning machine. In some embodiments, the sediment package classification scheme may be a non-sequence stratification classification scheme.

At block 322, the signal processor 106 may input the one or more properties and the one or more comparison parameters into a learning machine to generate sediment package classifications. The one or more properties may correspond to each sediment package in the seismic data. Additionally, the one or more comparison properties may correspond to each sediment package in the seismic data. In some embodiments, only a portion of the properties and/or comparison parameters may be input into the learning machine. For example, the properties and/or comparison parameters associated with a group of sediment packages within seismic data may be input into the learning machine. The learning machine may classify each sediment package that corresponds to the properties and/or parameters input into the learning machine. The sediment package classifications generated for each of the sediment packages may be based on the classification scheme applied to the learning machine in block 320. For example, the sediment packages may be classified as TST, HST, or LST if the classification scheme includes TST, HST, and LST. In some embodiments, the classifications may be compared to well information (e.g., well logs). For example, the sediment packages may be corroborated against fining-up and/or coarsening up stacking patterns and/or changes in water depth as described by facies changes and/or biostratigraphic data.

Figure 10:
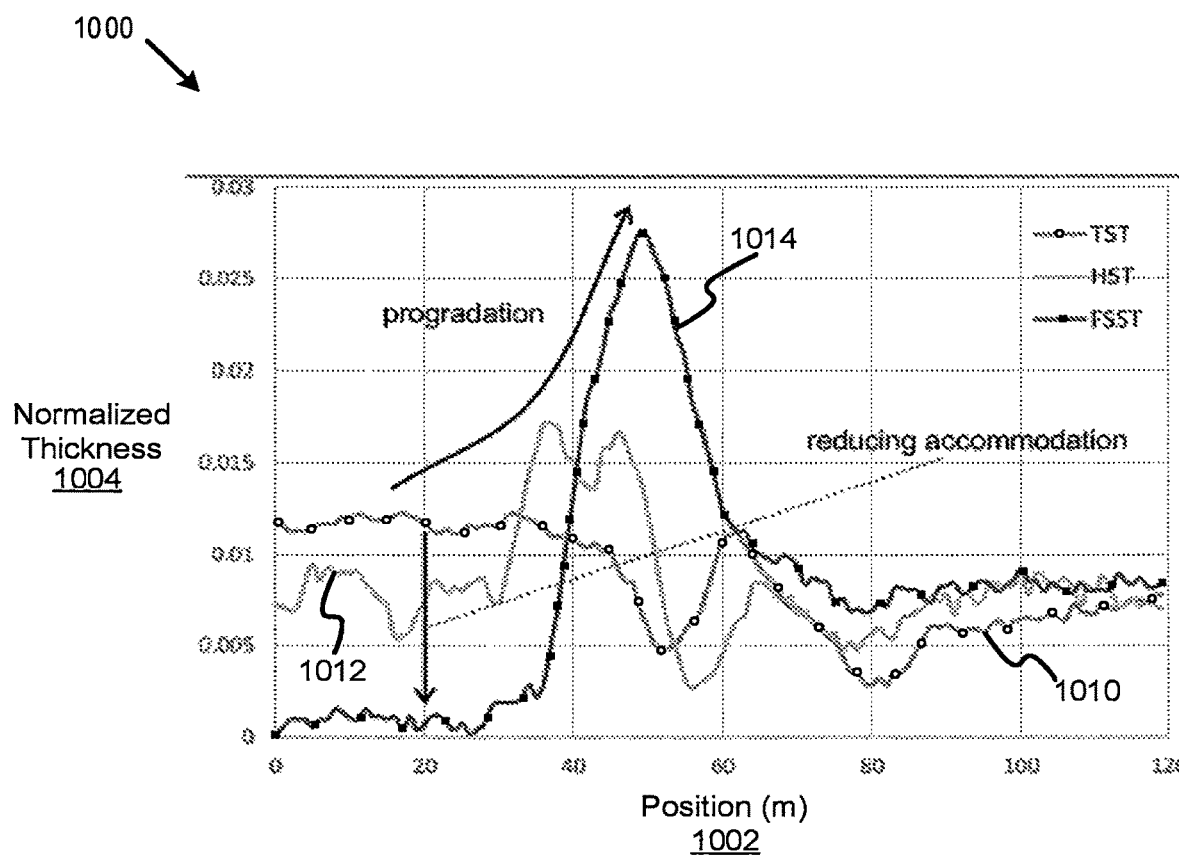
FIG. 10 is a graph depicting example sediment package classifications, according to some embodiments.

To help illustrate. FIG. 10 is a graph depicting example sediment package classifications, according to some embodiments. FIG. 10 depicts a graph 1000 that includes an x-axis 1002 and a y-axis 1004. The x-axis 1002 is the distance from land and having units of meters (m). The y-axis is the normalized thickness and is unitless. Thickness profiles 1010, 1012, and 1014 are normalized thickness profiles of sediment packages as describing in blocks 302-316. Properties and/or comparison parameters of the thickness profiles 1010, 1012, 1014 may be generated and input into the learning machine. The learning machine may be trained to identify the changes in the normalized thickness profiles relative to the other normalized thickness profiles based on the properties and comparison parameters. For example, the learning machine may identify progradation, through the properties and comparison parameters, based on the peak of each thickness profile 1010, 1012, and 1014 becoming increasingly distant from land (i.e., the location of the thickest sediment may be moving towards the basin). Alternatively, the learning machine may identify reducing accommodation, through the properties and comparison parameters, based on the reducing normalized thickness near land, where the normalized thickness of the normalized thickness profile 1014 is less than normalized thickness of the thickness profile 1012, and the normalized thickness of the thickness profile 1012 is less than the normalized thickness of the thickness profile 1010. The learning machine may then classify each sediment package based on the properties and comparison parameters. For instance, the sediment package corresponding to thickness profile 1010 may be classified as TST, the sediment package corresponding to thickness profile 1012 may be classified as HST, and the sediment package corresponding to thickness profile 1014 may be classified as FSST.

At block 324, the signal processor 106 may perform a subsurface operation based on the sediment package classifications.

Figure 11:
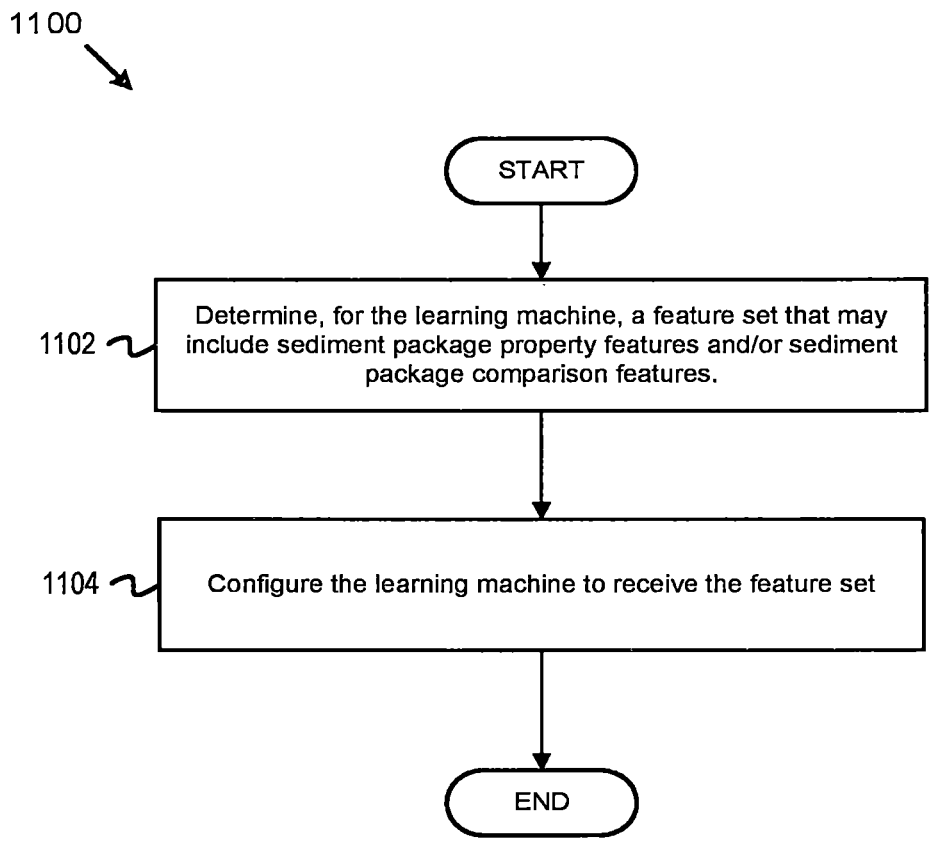
FIG. 11 is a flowchart depicting example operations to configure a learning machine, according to some embodiments.

FIG. 11 is a flowchart depicting example operations to configure a learning machine, according to some embodiments. FIG. 11 includes a flowchart 1100 that may determine a feature set of a well, and may configure the learning machine to receive the feature set as input. Operations of flowchart 1100 of FIG. 11 are described in reference to the signal processor 106 of FIG. 1. Operations of the flowchart 1100 start at block 1102.

At block 1102, the signal processor 106 may determine, for the learning machine, a feature set that may include sediment package property features and/or sediment package comparison features. A sediment package property feature may include features associated with the properties of normalized thickness profiles of a sediment package. A sediment package comparison parameter feature may include features associated with the comparison of normalized thickness profile properties. Some implementations may utilize any suitable feature set including any suitable value related to the sediment packages.

At block 1104, the signal processor 106 may configure the learning machine to receive the feature set as input. As noted, the features may include a sediment package property feature and a sediment package comparison feature. The flowchart 1100 ends after block 1104.

After block 1104, the learning machine may begin training itself based on training samples. The discussion of FIG. 12 provides additional details about training samples and training the learning machine.

Figure 12:
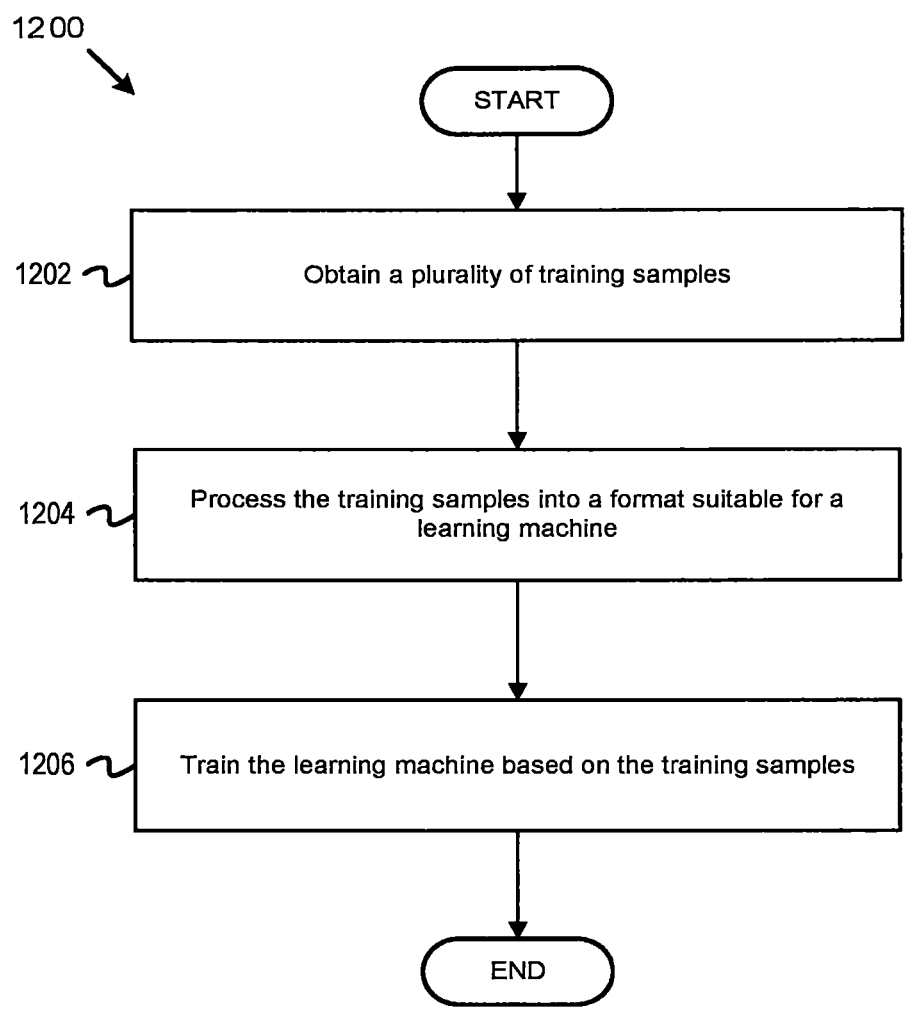
FIG. 12 is a flowchart depicting example operations to train a learning machine, according to some embodiments.

FIG. 12 is a flowchart depicting example operations to train a learning machine, according to some embodiments. FIG. 12 includes a flowchart 1200 that may train a supervised learning machine with training samples. Operations of flowchart 1200 of FIG. 12 are described in reference to the signal processor 106 of FIG. 1. Operations of the flowchart 1200 start at block 1202.

At block 1202, the signal processor 106 may obtain a plurality of training samples. Each training sample may be associated with a sediment package. The training samples may include a sediment package property sample and a sediment package comparison sample, each sample for a corresponding sediment package may be labeled with a sediment package classification sample. For example, a sediment package property sample and a sediment package comparison sample corresponding to a sediment package may be labeled as HST. The training samples may be generated by software and systems based on the system level design, numerical modeling, sample measurements, etc. For example, synthetic data may be generated utilizing tools such as forward stratigraphic models. The synthetic data may be the labeled with systems tract classifications to generate training samples. The training samples may also be generated by seismic interpretations, outcrop examples, etc. For example, a seismic volume may be interpreted to identify sediment packages and the properties and comparison parameters associated with each sediment package. Classifications of the sediment packages may be manually determined via the sediment properties and comparison parameters to generate training samples. Some embodiments may utilize any suitable technique to obtain training samples.

At block 1204, the signal processor 106 may process the training samples into a format suitable for a learning machine. For instance, if the learning machine is configured to accept inputs with values between 0 and 1, the sediment package property sample and/or the sediment package comparison parameter may be scaled to values that between 0 and 1.

At block 1206, the signal processor 106 may train the learning machine based on the training samples. The learning machine may use fewer than all the training samples in its training process. For example, the learning machine may utilize 80% of the training samples at block 1206. Later, the learning machine may use the remaining 20% of the training samples to test the learning machine. The learning machine may be updated (i.e., trained) as new training samples are obtained. For instance, the learning machine be trained with updated training samples obtained from synthetic data, seismic interpretation, well log data, etc. In some embodiments, the learning machine may be trained to output the sediment package classifications based on the classification scheme. For example, the learning machine may generate a range of classifications based on the systems tract classifications provided in the training samples.

Example Computer

Figure 13:
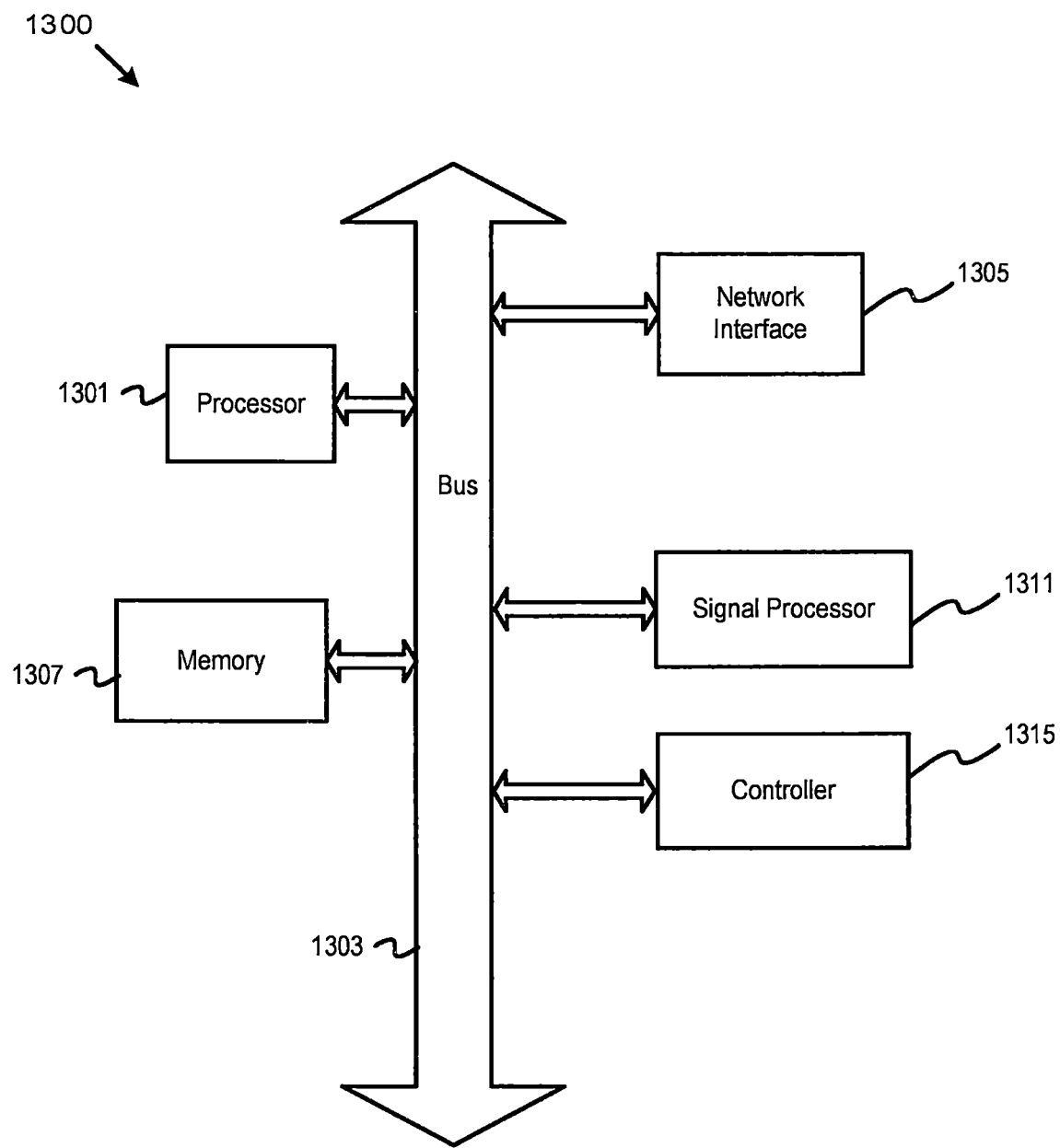
FIG. 13 is a block diagram depicting an example computer, according to some embodiments.

FIG. 13 is a block diagram depicting an example computer, according to some embodiments. FIG. 13 depicts a computer 1300 for classification of system tracts. The computer 1300 includes a processor 1301 (possibly including multiple processors, multiple cores, multiple nodes, and/or implementing multi-threading, etc.). The computer 1300 includes memory 1307. The memory 1307 may be system memory or any one or more of the above already described possible realizations of machine-readable media. The computer 1300 also includes a bus 1303 and a network interface 1305. The computer 1300 can communicate via transmissions to and/or from remote devices via the network interface 1305 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 1300 also includes a signal processor 1311 and a controller 1315 which may perform the operations described herein. For example, the signal processor 1311 may process seismic data and classify systems tracts of sediment packages based on properties of thickness profiles of the sediment packages. The controller 1315 may perform a subsurface operation based on the systems tract classifications. The signal processor 1311 and the controller 1315 can be in communication. Any one of the previously described functionalities may be partially (or entirely) implemented in hardware and/or on the processor 1301. For example, the functionality may be implemented with an application specific integrated circuit, in logic implemented in the processor 1301, in a co-processor on a peripheral device or card, etc. Further, realizations may include fewer or additional components not illustrated in FIG. 13 (e.g., video cards, audio cards, additional network interfaces, peripheral devices, etc.). The processor 1301 and the network interface 1305 are coupled to the bus 1303. Although illustrated as being coupled to the bus 1303, the memory 1307 may be coupled to the processor 1301.

While the aspects of the disclosure are described with reference to various implementations and exploitations, it will be understood that these aspects are illustrative and that the scope of the claims is not limited to them. In general, techniques for seismic horizon mapping as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment #1: A method comprising: obtaining a thickness for each of one or more sediment packages of a subsurface formation; generating a thickness profile of each of the one or more sediment packages based on the thickness; obtaining one or more properties of each of the one or more sediment packages based on the thickness profile; generating, via a learning machine, one or more sediment package classifications based on the one or more properties; and performing a subsurface operation based on the one or more sediment package classifications.

Embodiment #2: The method of Embodiment #1 further comprising: generating one or more comparison parameters based on a comparison of a first sediment package and a second sediment package, wherein the first sediment package is adjacent to the second sediment package; and generating, with the learning machine, the one of more sediment package classifications based on the one or more comparison parameters.

Embodiment #3: The method of Embodiments #2 further comprising: selecting a classification scheme for the learning machine; inputting, into the learning machine, the one or more properties and the one or more comparison parameters into the learning machine; and generating the one or more sediment package classifications based on the one or more properties, the one or more comparison parameters, and the classification scheme.

Embodiment #4: The method of any one or more of Embodiments #1-3 further comprising: obtaining horizons, wherein the horizons are generated from at least one of a three dimensional seismic dataset, a two-dimensional seismic dataset, and well log dataset; and generating the thickness for each of the one or more sediment packages based on the horizons.

Embodiment #5: The method of Embodiment #4 further comprising: generating a thickness map for each of the one or more sediment packages based on the thickness of each of the one or more sediment packages; determining a direction of a depositional transect; and aligning the thickness map for each of the one or more sediment packages with the direction of the depositional transect.

Embodiment #6: The method of Embodiment #5 further comprising; determining a mean thickness of each of the one or more sediment packages at one or more positions on the depositional transect; normalizing each of the mean thicknesses; and generating the thickness profile for each of the one or more sediment packages based on the normalized mean thickness of each of the one or more sediment packages at each of the one or more positions.

Embodiment #7: The method of any one or more of Embodiments #1-6 further comprising: determining, for the learning machine, a feature set including a sediment package property feature and a sediment package comparison feature; and configuring the learning machine to receive the feature set as input;

Embodiment #8: The method of Embodiment #7 further comprising: training the learning machine to classify each of the one or more sediment package based on a plurality of training samples, the training samples including seismic interpretations, synthetic data, and sediment package classification samples.

Embodiment #9: The method of any one or more of Embodiments #1-8, wherein the sediment package classifications include a lowstand systems tract, a highstand systems tract, a falling stage systems tract, and a transgressive systems tract.

Embodiment #10: The method of any one or more of Embodiments #1-9, wherein the one or more properties include a position of maximum sediment thickness, a mean locus of sediment deposition, a skew and kurtosis of the thickness profile, an upper quartile of the thickness profile, and a lower quartile of the thickness profile.

Embodiment #11: A non-transitory computer-readable medium including computer-executable instructions comprising: instructions to obtain a thickness for each of one or more sediment packages of a subsurface formation; instructions to generate a thickness profile of each of the one or more sediment packages based on the thickness; instructions to obtain one or more properties of each of the one or more sediment packages based on the thickness profile; instructions to generating, via a learning machine, one or more sediment package classifications based on the one or more properties; and instructions to perform a subsurface operation based on the one or more sediment package classifications.

Embodiment #12: The non-transitory computer-readable medium of Embodiment #11 further comprising: instructions to generate one or more comparison parameters based on a comparison of a first sediment package and a second sediment package, wherein the first sediment package is adjacent to the second sediment package; and instructions to generate, with the learning machine, one of more sediment package classifications based on the one or more comparison parameters.

Embodiment #13: The non-transitory computer-readable medium of Embodiment #12 further comprising: instructions to select a classification scheme for the learning machine; instructions to input, into the learning machine, the one or more properties and the one or more comparison parameters into the learning machine; and instructions to generate the one or more sediment package classifications based on the one or more properties, the one or more comparison parameters, and the classification scheme.

Embodiment #14: The non-transitory computer-readable medium of any one or more of Embodiments #11-13 further comprising: instructions to generate a thickness map for each of the one or more sediment packages based on the thickness of each of the one or more sediment packages; instructions to determine a direction of a depositional transect; and instructions to align the thickness map for each of the one or more sediment packages with the direction of the depositional transect.

Embodiment #15: The non-transitory computer-readable medium of Embodiment #14 further comprising; instructions to determine a mean thickness of each of the one or more sediment package at one or more positions on the depositional transect; instructions to normalize each of the mean thicknesses; and instructions to generate the thickness profile for each of the one or more sediment packages based on the normalized mean thickness of each of the one or more sediment package at each of the one or more positions.

Embodiment #16: The non-transitory computer-readable medium of any one of more of Embodiments #11-15 further comprising: instructions to determine, for the learning machine, a feature set including a sediment package property feature and a sediment package comparison feature; and instructions to configure the learning machine to receive the feature set as input.

Embodiment #17: The non-transitory computer-readable medium of Embodiment #16 further comprising: instructions to train the learning machine to classify each of the one or more sediment packages based on a plurality of training samples, the training samples including seismic interpretations, synthetic data, and sediment package classification samples.

Embodiment #18: The non-transitory computer-readable medium of any one or more of Embodiments #11-17, wherein the sediment package classifications include a lowstand systems tract, a highstand systems tract, a falling stage systems tract, and a transgressive systems tract.

Embodiment #19: A system comprising: a processor; and a computer-readable medium having instructions stored thereon that are: instructions to obtain a thickness for each of one or more sediment packages of a subsurface formation; instructions to generate a thickness profile of each of the one or more sediment packages based on the thickness; instructions to obtain one or more properties of each of the one or more sediment packages based on the thickness profile; instructions to generating, via a learning machine, one or more sediment package classifications based on the one or more properties; and instructions to perform a subsurface operation based on the one or more sediment package classifications.

Embodiment #20: The system of Embodiment #19 further comprising: instructions to generate comparison parameters based on a comparison of a first sediment package and a second sediment package, wherein the first sediment package is adjacent to the second sediment package; and instructions to generate, with the learning machine, one of more sediment package classifications based on the comparison parameters.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A method comprising:
   obtaining, via one or more sensors, subsurface data of a subsurface formation;
   obtaining a thickness for each of one or more sediment packages of the subsurface formation based on the subsurface data;
   generating a thickness profile along a depositional transect of each of the one or more sediment packages based on the thickness;
   obtaining one or more properties of the thickness profile for each of the one or more sediment packages;
   generating, via a learning machine, one or more sediment package classifications based on the one or more properties of the thickness profile for each of the one or more sediment packages; and
   performing a subsurface operation based on the one or more sediment package classifications.

2. The method of claim 1 further comprising:
   generating one or more comparison parameters based on a comparison of a first sediment package and a second sediment package, wherein the first sediment package is adjacent to the second sediment package; and
   generating, with the learning machine, the one of more sediment package classifications based on the comparison parameters.

3. The method of claim 2 further comprising:
   selecting a classification scheme for the learning machine;
   inputting, into the learning machine, the one or more properties and the one or more comparison parameters into the learning machine; and
   generating the one or more sediment package classifications based on the one or more properties, the one or more comparison parameters, and the classification scheme.

4. The method of claim 1 further comprising:
   obtaining horizons from the subsurface data, wherein the horizons are generated from at least one of a three dimensional seismic dataset, a two-dimensional seismic dataset, and well log dataset; and
   generating the thickness for each of the one or more sediment packages based on the horizons.

5. The method of claim 4 further comprising:
   generating a thickness map for each of the one or more sediment packages based on the thickness of each of the one or more sediment packages;
   determining a direction of the depositional transect; and
   aligning the thickness map for each of the one or more sediment packages with the direction of the depositional transect.

6. The method of claim 5 further comprising;
   determining a mean thickness of each of the one or more sediment packages at one or more positions on the depositional transect;
   normalizing each of the mean thicknesses; and
   generating the thickness profile for each of the one or more sediment packages based on the normalized mean thickness of each of the one or more sediment packages at each of the one or more positions.

7. The method of claim 1 further comprising:
determining, for the learning machine, a feature set including a sediment package property feature and a sediment package comparison feature; and
configuring the learning machine to receive the feature set as input.

8. The method of claim 7 further comprising:
training the learning machine to classify each of the one or more sediment packages based on a plurality of training samples, the training samples including seismic interpretations, synthetic data, and sediment package classification samples.

9. The method of claim 1, wherein the sediment package classifications include a lowstand systems tract, a highstand systems tract, a falling stage systems tract, and a transgressive systems tract.

10. The method of claim 1, wherein the one or more properties of the thickness profile include a position of maximum sediment thickness, a mean locus of sediment deposition, a skew and kurtosis of the thickness profile, an upper quartile of the thickness profile, and a lower quartile of the thickness profile.

11. A non-transitory computer-readable medium including computer-executable instructions comprising:
instructions to obtain, via one or more sensors, subsurface data of a subsurface formation;
instructions to obtain a thickness for each of one or more sediment packages of the subsurface formation based on the subsurface data;
instructions to generate a thickness profile along a depositional transect of each of the one or more sediment packages based on the thickness;
instructions to obtain one or more properties of the thickness profile for each of the one or more sediment packages;
instructions to generating, via a learning machine, one or more sediment package classifications based on the one or more properties of the thickness profile for each of the one or more sediment packages; and
instructions to perform a subsurface operation based on the one or more sediment package classifications.

12. The non-transitory computer-readable medium of claim 11 further comprising:
instructions to generate one or more comparison parameters based on a comparison of a first sediment package and a second sediment package, wherein the first sediment package is adjacent to the second sediment package; and
instructions to generate, with the learning machine, the one of more sediment package classifications based on the comparison parameters.

13. The non-transitory computer-readable medium of claim 12 further comprising:
instructions to select a classification scheme for the learning machine;
instructions to input, into the learning machine, the one or more properties and the one or more comparison parameters into the learning machine; and
instructions to generate the one or more sediment package classifications based on the one or more properties, the one or more comparison parameters, and the classification scheme.

14. The non-transitory computer-readable medium of claim 11 further comprising:
instructions to generate a thickness map for each of the one or more sediment packages based on the thickness of each of the one or more sediment packages;
instructions to determine a direction of the depositional transect; and
instructions to align the thickness map for each of the one or more sediment packages with the direction of the depositional transect.

15. The non-transitory computer-readable medium of claim 14 further comprising;
instructions to determine a mean thickness of each of the one or more sediment packages at one or more positions on the depositional transect;
instructions to normalize each of the mean thicknesses; and
instructions to generate the thickness profile for each of the one or more sediment packages based on the normalized mean thickness of each of the one or more sediment package at each of the one or more positions.

16. The non-transitory computer-readable medium of claim 11 further comprising:
instructions to determine, for the learning machine, a feature set including a sediment package property feature and a sediment package comparison feature; and
instructions to configure the learning machine to receive the feature set as input.

17. The non-transitory computer-readable medium of claim 16 further comprising:
instructions to train the learning machine to classify each of the one or more sediment packages based on a plurality of training samples, the training samples including seismic interpretations, synthetic data, and sediment package classification samples.

18. The non-transitory computer-readable medium of claim 11, wherein the sediment package classifications include a lowstand systems tract, a highstand systems tract, a falling stage systems tract, and a transgressive systems tract.

19. A system comprising:
one or more sensors;
a processor; and
a computer-readable medium having instructions stored thereon that are:
instructions to obtain, via the one or more sensors, subsurface data of a subsurface formation;
instructions to obtain a thickness for each of one or more sediment packages of the subsurface formation based on the subsurface data;
instructions to generate a thickness profile along a depositional transect of each of the one or more sediment packages based on the thickness;
instructions to obtain one or more properties of the thickness profile for each of the one or more sediment packages;
instructions to generating, via a learning machine, one or more sediment package classifications based on the one or more properties of the thickness profile for each of the one or more sediment packages; and
instructions to perform a subsurface operation based on the one or more sediment package classifications.

20. The system of claim 19 further comprising:
instructions to generate comparison parameters based on a comparison of a first sediment package and a second sediment package, wherein the first sediment package is adjacent to the second sediment package; and
instructions to generate, with the learning machine, the one of more sediment package classifications based on the comparison parameters.

* * * * *